United States Patent
Ohshita et al.

(10) Patent No.: US 9,843,269 B2
(45) Date of Patent: Dec. 12, 2017

(54) SWITCHING POWER SUPPLY CIRCUIT CONTROL METHOD

(71) Applicant: DAIKIN INDUSTRIES, LTD., Osaka-shi, Osaka (JP)

(72) Inventors: Kazuhiro Ohshita, Kusatsu (JP); Kazuhiro Nakatani, Kusatsu (JP); Norio Sakae, Kusatsu (JP); Mitsuru Imoto, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 109 days.

(21) Appl. No.: 14/441,463

(22) PCT Filed: Nov. 6, 2013

(86) PCT No.: PCT/JP2013/080012
§ 371 (c)(1),
(2) Date: May 7, 2015

(87) PCT Pub. No.: WO2014/073567
PCT Pub. Date: May 15, 2014

(65) Prior Publication Data
US 2015/0311816 A1    Oct. 29, 2015

(30) Foreign Application Priority Data

Nov. 8, 2012    (JP) ................. 2012-246223

(51) Int. Cl.
*H02M 7/217* (2006.01)
*H02M 1/12* (2006.01)
(Continued)

(52) U.S. Cl.
CPC ............. *H02M 7/217* (2013.01); *H02M 1/12* (2013.01); *H02M 1/4225* (2013.01);
(Continued)

(58) Field of Classification Search
CPC ................. H02M 1/12; H02M 1/4225; H02M 2001/0009; H02M 2001/0032;
(Continued)

(56) References Cited

U.S. PATENT DOCUMENTS 8,406,020 B2    3/2013    Chiba
8,817,506 B2    8/2014    Shimomugi et al.
(Continued)

FOREIGN PATENT DOCUMENTS

CN    102138278 A    7/2011
DE    10036378 A1    5/2001
(Continued)

*Primary Examiner* — Adolf Berhane
*Assistant Examiner* — Bart Iliya
(74) *Attorney, Agent, or Firm* — Birch, Stewart, Kolsach & Birch, LLP

(57) ABSTRACT

When power consumption of a load is smaller than a first threshold, a switch element of each of one or more circuits is made nonconductive to supply power from all of the one or more circuits to the load. When the power consumption of the load is larger than the first threshold, the switch element of at least one of the one or more circuits is made intermittently conductive to supply power from all of the one or more circuits to the load.

15 Claims, 13 Drawing Sheets

(51) Int. Cl.
*H02M 1/42* (2007.01)
*H02M 3/158* (2006.01)
*H02M 1/00* (2006.01)

(52) U.S. Cl.
CPC .. *H02M 3/1584* (2013.01); *H02M 2001/0009* (2013.01); *H02M 2001/0032* (2013.01); *H02M 2001/0048* (2013.01); *H02M 2003/1586* (2013.01); *Y02B 70/126* (2013.01); *Y02B 70/1491* (2013.01); *Y02B 70/16* (2013.01)

(58) Field of Classification Search
CPC . H02M 2001/0048; H02M 2003/1586; H02M 3/1584; H02M 7/217; Y02B 70/126; Y02B 70/1491; Y02B 70/16
See application file for complete search history.

(56) References Cited

U.S. PATENT DOCUMENTS

| | | | |
|---|---|---|---|
| 8,994,343 | B2 | 3/2015 | Ohshita et al. |
| 2005/0128773 | A1 | 6/2005 | Yang et al. |
| 2008/0205103 | A1* | 8/2008 | Sutardja ............. G05F 1/70 363/84 |
| 2010/0054000 | A1 | 3/2010 | Huynh |
| 2010/0181970 | A1* | 7/2010 | Yang ............. H02M 3/1584 323/218 |
| 2010/0226149 | A1 | 9/2010 | Masumoto |
| 2011/0095731 | A1 | 4/2011 | Zhao et al. |
| 2011/0132899 | A1 | 6/2011 | Shimomugi et al. |
| 2011/0216558 | A1 | 9/2011 | Uno |
| 2012/0286684 | A1* | 11/2012 | Melanson .......... H02M 1/4225 315/224 |
| 2014/0320059 | A1 | 10/2014 | Shimomugi et al. |

FOREIGN PATENT DOCUMENTS

| | | |
|---|---|---|
| EP | 2337201 A1 | 6/2011 |
| JP | 3044650 B | 5/2000 |
| JP | 2009-291034 A | 12/2009 |
| JP | 2010-187521 A | 8/2010 |
| JP | 2010-206941 A | 9/2010 |
| JP | 2011-019323 A | 1/2011 |
| JP | 2011-223865 A | 11/2011 |
| WO | WO 2010/023978 A1 | 3/2010 |
| WO | WO 2010/061654 A1 | 3/2010 |

* cited by examiner

(54) SWITCHING POWER SUPPLY CIRCUIT
CONTROL METHOD

TECHNICAL FIELD

The present disclosure relates to a method for controlling a switching power supply circuit, and is, for example, applied to a case where the switching power supply circuit is configured as a boost converter.

BACKGROUND ART

Power factor correction circuits having configuration of so-called boost converters have been known. In International Publication No. 2010/023978 and Japanese Patent Application Laid-Open No. 2011-223865 listed below, for example, a pair of boost converters are provided, and a so-called interleaved method is adopted.

Operations of such boost converters involve switching, and thus involve phenomena of switching loss, generation of harmonics, and, eventually, generation of leakage current. In order to improve these phenomena, in Japanese Patent Application Laid-Open No. 2009-291034 and Japanese Patent Application Laid-Open No. 2011-019323 listed below, a discontinuous mode is adopted in operation of a boost converter when a load is small, and a critical mode of the boost converter is adopted when the load is large. Similarly, in International Publication No. 2010/023978, a discontinuous mode is adopted at a low load, and a critical mode or a continuous mode is adopted at a high load.

The terms "discontinuous mode", "critical mode", and "continuous mode" should originally be used as for a current mode of current flowing through a reactor of a boost converter. In the present application, however, these terms are also used to express an operating mode of the boost converter having the reactor, for convenience's sake.

Adoption of the discontinuous mode in operation of the boost converter at a low load as described above reduces switching frequency in an operating area in which a power component of harmonics is small, and thereby achieves reduction of a harmonic power component and reduction of switching loss.

Japanese Patent No. 3044650 discloses technology for compensating leakage current, which is described later.

SUMMARY OF INVENTION

Problems to be Solved by the Invention

As long as switching is involved, however, switching loss of a boost converter is inevitable even in a discontinuous mode.

Furthermore, leakage current tends to increase with decreasing load in a wide operating area, and thus there is an operating area in which leakage current of a boost converter cannot sufficiently be reduced even if a discontinuous mode is adopted.

The present disclosure has been conceived in view of the above-mentioned problems, and aims to provide technology for suppressing an increase in leakage current, a decrease in efficiency, and an increase in harmonics even when a load of a switching power supply circuit is small.

Means for Solving the Problems

A switching power supply circuit control method according to the present disclosure is a method for controlling a switching power supply circuit including: first and second input terminals (P1, P2); first and second output terminals (P3, P4) to which a capacitor (C1) and a load (4) are connected; a second power supply line (LL) connecting the second input terminal and the second output terminal; and one or more circuits (3a, 3b).

Each of the one or more circuits includes: a first power supply line (LH1, LH2) connecting the first input terminal and the first output terminal; a reactor (L1, L2) provided on the first power supply line; a diode (D11, D21) connected in series to the reactor on the first power supply line, and positioned such that an anode thereof is directed toward the reactor; and a switch element (S1, S2) provided between the second power supply line and a point between the reactor and the diode.

In the control method, when power consumption of the load is smaller than a first threshold (P11; P12; P13; P14; P15; P16; P21; P22), the switch element of each of the one or more circuits is made nonconductive, and power is supplied from all of the one or more circuits to the load. When the power consumption of the load is larger than the first threshold, the switch element of at least one of the one or more circuits is made intermittently conductive, and power is supplied from all of the one or more circuits to the load.

A second aspect of the switching power supply circuit control method according to present disclosure is a first aspect thereof, wherein a second threshold (P21; P22; P23) below is larger than the first threshold (P11; P12; P13), and a third threshold (P31; P32; P33) below is larger than the second threshold.

When the power consumption of the load is larger than the first threshold and smaller than the second threshold, a discontinuous mode is adopted as a current mode of current flowing through the reactor.

When the power consumption of the load is larger than the second threshold and smaller than the third threshold, a critical mode is adopted as the current mode.

When the power consumption of the load is larger than the third threshold, a continuous mode is adopted as the current mode.

A third aspect of the switching power supply circuit control method according to present disclosure is the first aspect, wherein a second threshold (P21; P22; P23) below is larger than the first threshold (P11; P12; P13).

When the power consumption of the load is larger than the first threshold and smaller than the second threshold, a discontinuous mode is adopted as a current mode of current flowing through the reactor.

When the power consumption of the load is larger than the second threshold, a critical mode is adopted as the current mode.

A fourth aspect of the switching power supply circuit control method according to the present disclosure is the first aspect, wherein a second threshold (P31; P32; P33) below is larger than the first threshold (P21; P22; P23).

When the power consumption of the load is larger than the first threshold and smaller than the second threshold, a critical mode is adopted as a current mode of current flowing through the reactor.

When the power consumption of the load is larger than the second threshold, a continuous mode is adopted as the current mode.

A fifth aspect of the switching power supply circuit control method according to the present disclosure is the first aspect, wherein a second threshold (P31; P32; P33) below is larger than the first threshold (P11; P12; P13).

When the power consumption of the load is larger than the first threshold and smaller than the second threshold, a discontinuous mode is adopted as a current mode of current flowing through the reactor.

When the power consumption of the load is larger than the second threshold, a continuous mode is adopted as the current mode.

A sixth aspect of the switching power supply circuit control method according to the present disclosure is the second aspect, wherein magnitude of leakage current from the switching power supply circuit in a case of adopting the discontinuous mode as the current mode when the power consumption of the load is the first threshold (P11), the magnitude of leakage current in a case of adopting the critical mode as the current mode when the power consumption of the load is the second threshold (P21), and the magnitude of leakage current in a case of adopting the continuous mode as the current mode when the power consumption of the load is the third threshold (P31) are equal to one another.

A seventh aspect of the switching power supply circuit control method according to the present disclosure is the third aspect, wherein magnitude of leakage current from the switching power supply circuit in a case of adopting the discontinuous mode as the current mode when the power consumption of the load is the first threshold (P11) and the magnitude of leakage current in a case of adopting the critical mode as the current mode when the power consumption of the load is the second threshold (P21) are equal to each other.

An eighth aspect of the switching power supply circuit control method according to the present disclosure is the fourth aspect, wherein magnitude of leakage current from the switching power supply circuit in a case of adopting the critical mode as the current mode when the power consumption of the load is the first threshold (P21) and the magnitude of leakage current in a case of adopting the continuous mode as the current mode when the power consumption of the load is the second threshold (P31) are equal to each other.

A ninth aspect of the switching power supply circuit control method according to the present disclosure is the fifth aspect, wherein magnitude of leakage current from the switching power supply circuit in a case of adopting the discontinuous mode as the current mode when the power consumption of the load is the first threshold (P11) and the magnitude of leakage current in a case of adopting the continuous mode as the current mode when the power consumption of the load is the second threshold (P31) are equal to each other.

A tenth aspect of the switching power supply circuit control method according to the present disclosure is the second aspect, wherein at least two of efficiency of the switching power supply circuit in a case of adopting the discontinuous mode as the current mode when the power consumption of the load is the first threshold (P12), the efficiency in a case of adopting the critical mode as the current mode when the power consumption of the load is the second threshold (P22), and the efficiency in a case of adopting the continuous mode as the current mode when the power consumption of the load is the third threshold (P31) are different from each other.

An eleventh aspect of the switching power supply circuit control method according to the present disclosure is the second aspect, wherein magnitude of harmonics generated in the switching power supply circuit in a case of adopting the discontinuous mode as the current mode when the power consumption of the load is the first threshold (P13), the magnitude of harmonics in a case of adopting the critical mode as the current mode when the power consumption of the load is the second threshold (P23), and the magnitude of harmonics in a case of adopting the continuous mode as the current mode when the power consumption of the load is the third threshold (P33) are equal to one another.

A twelfth aspect of the switching power supply circuit control method according to the present disclosure is the third aspect, wherein efficiency of the switching power supply circuit in a case of adopting a nonconductive mode as the current mode when the power consumption of the load is the first threshold (P13) and the efficiency in a case of adopting the discontinuous mode as the current mode when the power consumption of the load is the second threshold (P23) are equal to each other.

A thirteenth aspect of the switching power supply circuit control method according to the present disclosure is the fourth aspect, wherein efficiency of the switching power supply circuit in a case of adopting a nonconductive mode as the current mode when the power consumption of the load is the first threshold (P13) and the efficiency in a case of adopting the critical mode as the current mode when the power consumption of the load is the second threshold (P33) are equal to each other.

A fourteenth aspect of the switching power supply circuit control method according to the present disclosure is the fifth aspect, wherein efficiency of the switching power supply circuit in a case of adopting a nonconductive mode as the current mode when the power consumption of the load is the first threshold (P13) and the efficiency in a case of adopting the discontinuous mode as the current mode when the power consumption of the load is the second threshold (P23) are equal to each other.

A fifteenth aspect of the switching power supply circuit control method according to the present disclosure is the first aspect, wherein the switching power supply circuit includes, as the one or more circuits (3a, 3b), a pair of circuits, and the pair of circuits is capable of performing an operation in an interleaved method.

A second threshold (P24; P25; P26) below is larger than the first threshold (P14; P15; P16), a third threshold (P34; P35; P36) below is larger than the second threshold, a fourth threshold (P44; P45; P46) below is larger than the third threshold, and a fifth threshold (P64; P65; P66) below is larger than the fourth threshold.

When the power consumption of the load is larger than the first threshold and smaller than the second threshold, the switch element of one of the pair of circuits is made nonconductive, and a discontinuous mode is adopted as a current mode of current flowing through the reactor of the other one of the pair of circuits.

When the power consumption of the load is larger than the second threshold and smaller than the third threshold, the discontinuous mode is adopted as the current mode of current flowing through the reactor of each of the pair of circuits.

When the power consumption of the load is larger than the third threshold and smaller than the fourth threshold, the switch element of one of the pair of circuits is made nonconductive, and a critical mode is adopted as the current mode of current flowing through the reactor of the other one of the pair of circuits.

When the power consumption of the load is larger than the fourth threshold and smaller than the fifth threshold, the critical mode is adopted as the current mode of current flowing through the reactor of each of the pair of circuits, or the switch element of one of the pair of circuits is made nonconductive, and a continuous mode is adopted as the current mode of current flowing through the reactor of the other one of the pair of circuits.

When the power consumption of the load is larger than the fifth threshold, the continuous mode is adopted as the current mode of current flowing through the reactor of each of the pair of circuits.

Effects of the Invention

According to the switching power supply circuit control method according to the present disclosure, an increase in leakage current, a decrease in efficiency, and an increase in harmonics are suppressed even when power consumption of a load of a switching power supply circuit is small.

Objects, features, aspects and advantages of the present disclosure will become more apparent from the following detailed description and the accompanying drawings.

DESCRIPTION OF EMBODIMENTS

Figure 1:
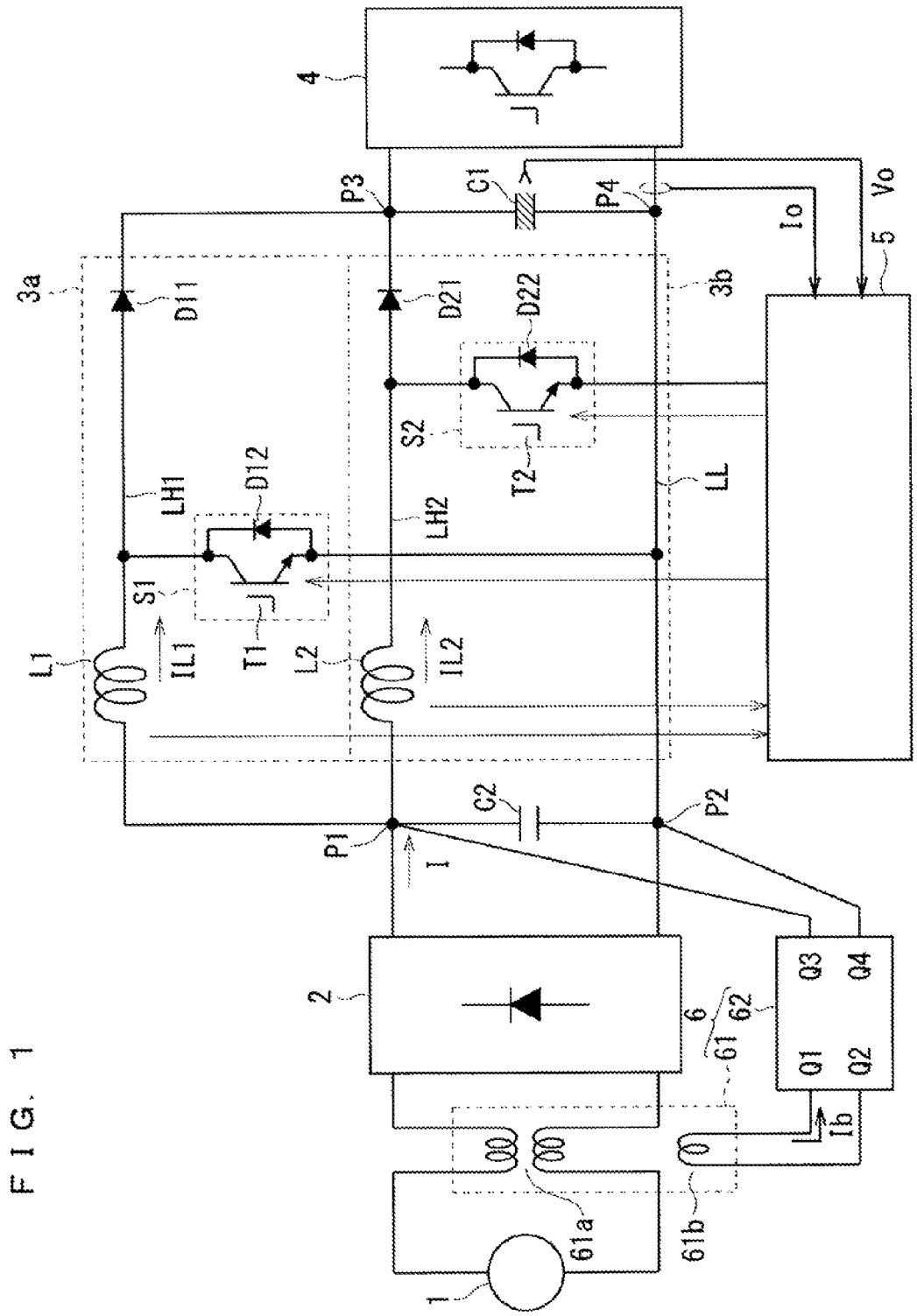
FIG. 1 is a circuit diagram illustrating a switching power supply circuit as a target of control methods according to Embodiment 1 and Embodiment 2.

FIG. 1 is a circuit diagram illustrating a switching power supply circuit as a target of control methods according to Embodiment 1 and Embodiment 2 described below.

The switching power supply circuit includes input terminals P1 and P2, output terminals P3 and P4, a power supply line LL, and circuits 3a and 3b. The power supply line LL connects the input terminal P2 and the output terminal P4.

A capacitor C1 and a load 4 are connected in parallel to the output terminals P3 and P4.

Although an inverter is illustrated herein as the load 4, the load 4 is actually understood so as to include a target of power supply from the inverter. Power consumption of the load 4 described below is thus understood so as to include not only power consumed by the load 4 itself but also power output from the load 4.

A DC voltage is applied across the input terminals P1 and P2. In the example of FIG. 1, a diode rectifier circuit 2 is connected to the input terminals P1 and P2. The diode rectifier circuit 2 rectifies an AC voltage from an AC power supply 1, and applies the DC voltage resulting from rectification across the input terminals P1 and P2. A potential applied to the input terminal P2 is herein lower than a potential applied to the input terminal P1. Through the voltage application and operations of the circuits 3a and 3b described later, DC current I flows out of the diode rectifier circuit 2.

A leakage current detector 61 is provided between the diode rectifier circuit 2 and the AC power supply 1. The leakage current detector 61 constitutes a leakage current reduction device 6 along with a compensating current output unit 62.

The leakage current detector 61 detects current Ib corresponding to leakage current from a difference between a pair of current flows input into the diode rectifier circuit 2, and outputs the detected current Ib to the compensating current output unit 62. Specifically, the leakage current detector 61 includes a common mode choke coil 61a provided between the AC power supply 1 and the diode rectifier circuit 2, and a coil 61b inductively coupled to the common mode choke coil 61a.

Basic description of the leakage current reduction device 6 is disclosed in Japanese Patent No. 3044650, and thus the leakage current reduction device 6 is briefly described as follows.

The compensating current output unit 62 includes a pair of input terminals Q1 and Q2 connected to the coil 61b, and output terminals Q3 and Q4 allowing compensating current Ic to flow in response to the detected current Ib.

FIG. 1 illustrates a case where the output terminals Q3 and Q4 are respectively connected to the input terminals P1 and P2. Alternatively, the output terminals Q3 and Q4 may respectively be connected to the output terminals P3 and P4.

Figure 2:
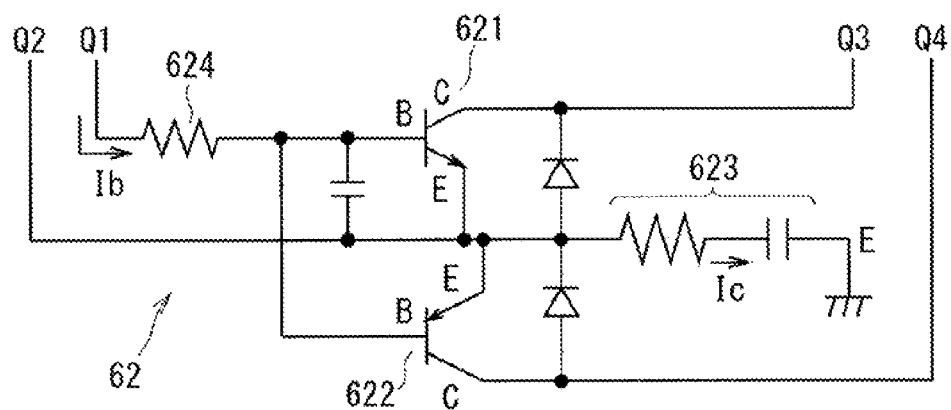
FIG. 2 is a circuit diagram illustrating configuration of a compensating current output unit.

FIG. 2 is a circuit diagram illustrating configuration of the compensating current output unit 62. The compensating current output unit 62 includes transistors 621 and 622 connected in series between the output terminals Q3 and Q4. The transistors 621 and 622 are of different conductivity types from each other. Specifically, the transistor 621 is of an NPN type, and the transistor 622 is of a PNP type.

A connection point at which the transistors 621 and 622 are connected to each other is grounded, where the compensating current Ic is output. The current Ib flows between the connection point and bases of the transistors 621 and 622.

In order to cut a DC component of the compensating current Ic, it is desirable to provide an element 623 having a capacitive impedance, e.g., a capacitor and a resistor connected in series, between the connection point and the ground.

Specifically, the base of the transistor 621, which is a control electrode of the transistor 621, and the base of the transistor 622, which is a control electrode of the transistor 622, are connected to the leakage current detector 61, for example, via a resistor 624. By the current Ib flowing through the resistor 624, a base bias voltage is applied to the transistors 621 and 622.

A capacitor C2 may be provided between the input terminals P1 and P2. The capacitor C2 can reduce noise of current input into the circuits 3a and 3b.

The circuits 3a and 3b are each connected to the input terminals P1 and P2 and the output terminals P3 and P4. The circuits 3a and 3b function as a boost converter, cooperating with the capacitor C1. As a result, the circuits 3a and 3b function as a power factor correction circuit that boosts the DC voltage applied across the input terminals P1 and P2, and corrects a power factor at an input side.

The circuit 3a includes a power supply line LH1, a reactor L1, a diode D11, and a switch element S1. The power supply line LH1 connects the input terminal P1 and the output terminal P3. The reactor L1 is provided on the power supply line LH1. The diode D11 is connected in series to the reactor L1 at a side closer to the output terminal P3 than the reactor L1 is. The diode D11 is provided such that an anode thereof is directed toward the reactor L1.

The switch element S1 is provided between the power supply line LL and a point between the reactor L1 and the diode D11.

The circuit 3b includes a power supply line LH2, a reactor L2, a diode D21, and a switch element S2. A connection relationship among the power supply line LH2, the reactor L2, the diode D21, and the switch element S2 is the same as a connection relationship among the power supply line LH1, the reactor L1, the diode D11, and the switch element S1.

In the example of FIG. 1, the switch element S1 includes a transistor T1 and a diode D12. The transistor T1 is an insulated gate bipolar transistor, for example, and is provided such that an emitter electrode thereof is directed toward the power supply line LL. The switch element S1 does not necessarily have to include the transistor T1 and the diode D12. For example, the diode D12 may not be provided. As the switch element S1, a metal-oxide-semiconductor (MOS) field effect transistor may be used, for example.

The switch element S2 includes a transistor T2 and a diode D22. A connection relationship between the transistor T2 and the diode D22 is the same as a connection relationship between the transistor T1 and the diode D12. The diode D22 is not essential, and the switch element S2 may be a MOS field effect transistor, for example.

Control of conduction/nonconduction of the switch elements S1 and S2 described below is performed by a controller 5 unless otherwise indicated.

The controller 5 detects power consumed by the load 4. Specifically, a voltage Vo across the capacitor C1, and current Io flowing between the load 4 and the power supply line LL are detected. Power consumption of the load 4 is calculated from the above-mentioned voltage Vo and current Io.

The controller 5 also detects current IL1 flowing through the reactor L1 and current IL2 flowing through the reactor L2. The controller 5 controls conduction/nonconduction of the switch elements S1 and S2 to provide desired power consumption to the load 4. What current mode is adopted through the control depends on the above-mentioned power consumption, and is determined as described later.

The controller 5 can be configured to include a microcomputer and a storage device. The microcomputer performs each of processing steps (in other words, procedures) described in a program. The above-mentioned storage device may be configured as one or a plurality of various storage devices including read-only memory (ROM), random-access memory (RAM), rewritable nonvolatile memory (e.g., erasable programmable ROM (EPROM)), and a hard disk device, for example. The storage device stores various pieces of information, data, and the like, stores a program to be executed by the microcomputer, and provides a work area for executing a program. The microcomputer can be understood so as to function as various means corresponding to respective processing steps described in a program, or can be understood so as to achieve various functions corresponding to the respective processing steps. The controller 5 is not limited to that described above, and part or all of various procedures performed by the controller 51, or the various means or various functions achieved by the controller 5 may be achieved by hardware.

In a switching power supply circuit having the configuration, only one of the circuits 3a and 3b may be used, and the other one of the circuits 3a and 3b may be omitted. In order to simplify description below, control over a switching power supply circuit having a configuration in which the circuit 3b is omitted and the circuit 3a is used is described first in Embodiment 1.

Embodiment 1

FIGS. 3 to 6 are each a graph showing a waveform of the current I flowing from the diode rectifier circuit 2 (thick lines) and a waveform of the current IL1 flowing through the reactor L1 (triangle waves in thin lines in FIGS. 4 to 6) in one cycle (a phase of 0 degrees to 360 degrees) of the AC power supply 1. Cases where effective values of the current I are made equal are shown.

Figure 3:
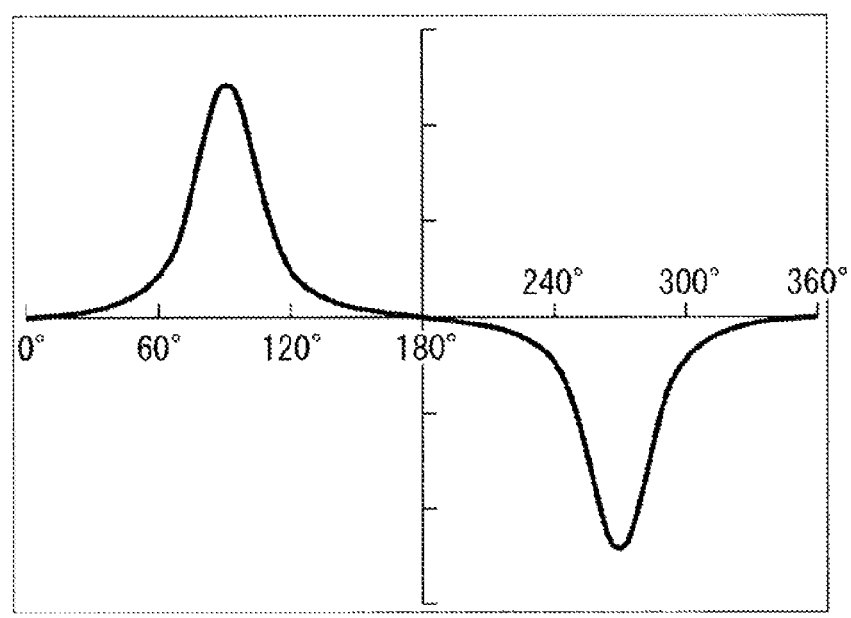
FIGS. 3 to 6 are graphs showing a waveform of current flowing from a diode rectifier circuit and a waveform of current flowing through a reactor.
Figure 4:
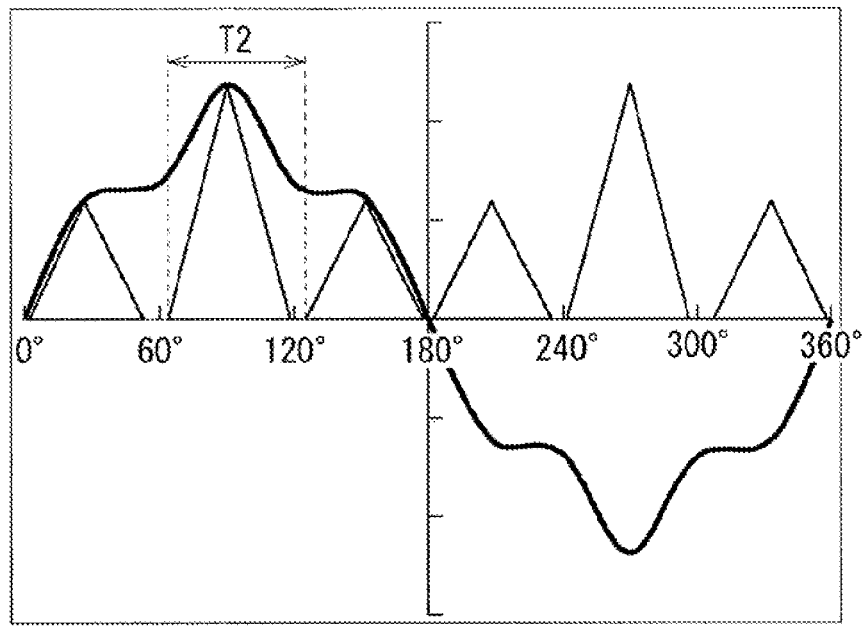
Figure 5:
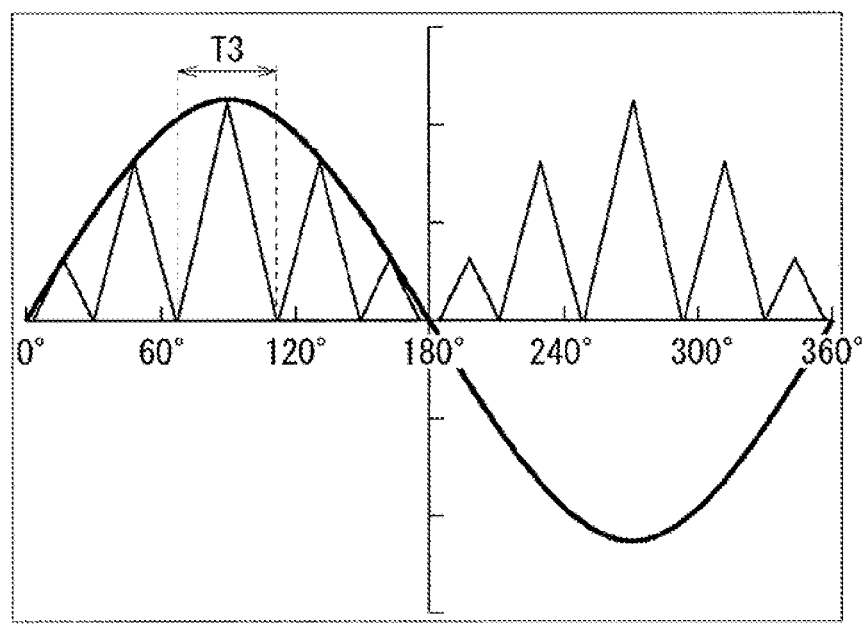
Figure 6:
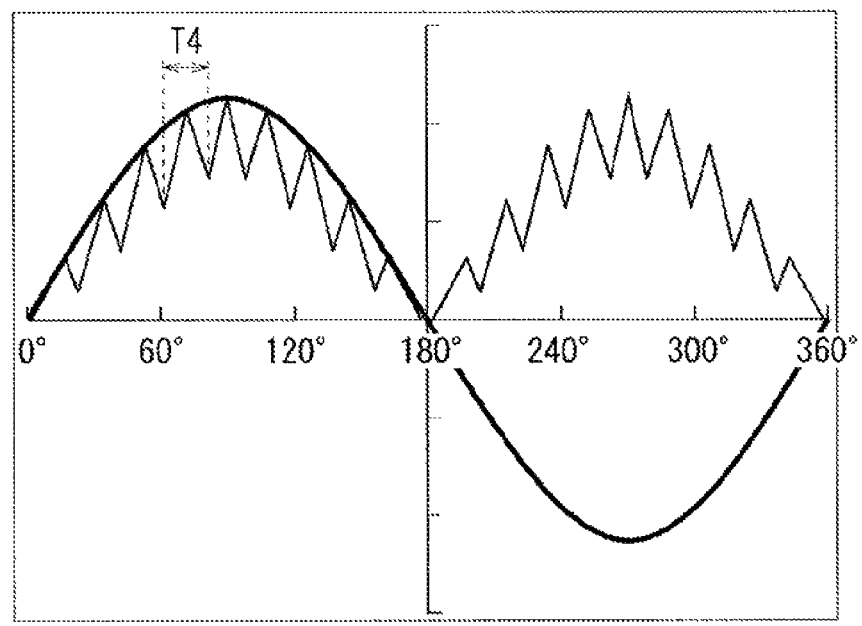

FIG. 3 shows a case where the switch element S1 is made nonconductive, and power is supplied to the load 4. In this case, current does not flow through the switch element S1, and, since the circuit 3b is omitted, the current IL1 is equal to the current I, and a graph of the current IL1 matches that of the current I. FIGS. 4 to 6 show cases where the switch element S1 is made intermittently conductive, and power is supplied to the load 4. More specifically, FIGS. 4, 5, and 6 show cases in a discontinuous mode, a critical mode, and a continuous mode, respectively. An operation of the circuit 3a in the case where the switch element S1 is made nonconductive, and power is supplied to the load 4 is provisionally referred to as a "nonconductive mode", for convenience's sake.

As understood through comparison among these figures, the waveform of the current I becomes closer to a sine waveform, generation of harmonics are more suppressed, and a power factor is more corrected in the order of the nonconductive mode, the discontinuous mode, the critical mode, and the continuous mode.

On the other hand, an interval at which the switch element S1 transitions from a nonconductive state to a conductive state, a so-called switching cycle, changes to cycles T2, T3, and T4 in the discontinuous mode, the critical mode, and the continuous mode, in this order. Since T2>T3>T4 (i.e., 1/T2<1/T3<1/T4) holds true, it is found that switching frequency increases, and switching loss increases in the order of the discontinuous mode, the critical mode, and the continuous mode.

It is therefore true that adoption of the discontinuous mode when a load is small is effective in reducing the switching loss, as indicated in Japanese Patent Application Laid-Open No. 2009-291034, International Publication No. 2010/023978 and Japanese Patent Application Laid-Open No. 2011-019323. As long as switching is involved, however, the switching loss of the boost converter is inevitable even in the discontinuous mode. In contrast, the switching loss theoretically does not occur in the nonconductive mode, as switching is not adopted in the nonconductive mode.

Furthermore, leakage current has single-peaked characteristics with respect to the load, and thus there is an operating area in which the leakage current of the boost converter cannot sufficiently be reduced even when the discontinuous mode is adopted. The leakage current increases with decreasing load even if the discontinuous mode is adopted, and it is desirable to reduce the increase in leakage current.

On the other hand, in the nonconductive mode, the leakage current can be reduced more than that in the discontinuous mode, as the switching frequency can be deemed 0 (<1/T2<1/T3<1/T4).

Switching between the nonconductive mode and the other operating modes can easily be achieved through use of conventional control technology, as with switching among the discontinuous mode, the critical mode, and the continuous mode.

Figure 7:
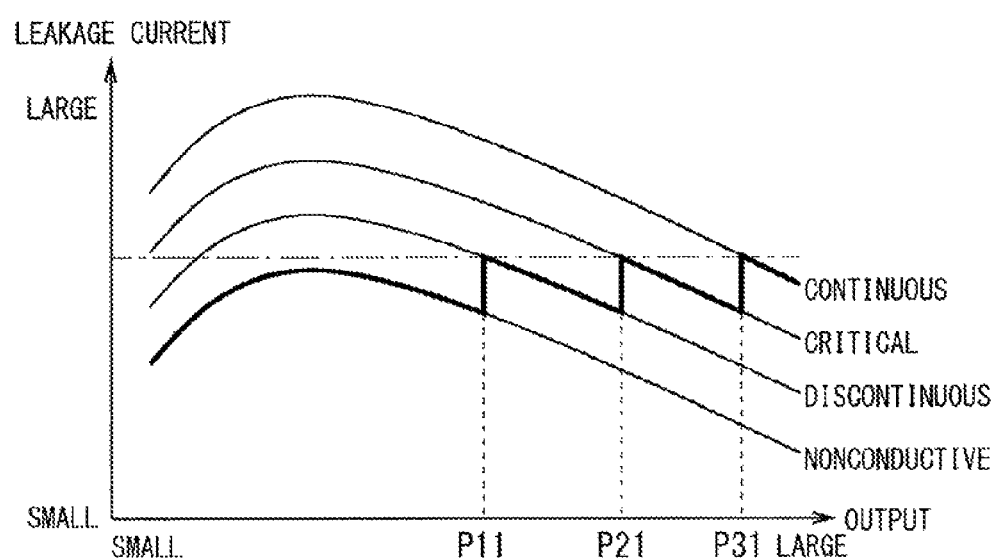
FIG. 7 is a graph showing a relationship between output and leakage current in a nonconductive mode, a discontinuous mode, a critical mode, and a continuous mode in Embodiment 1.

FIG. 7 is a graph showing a relationship between output of the switching power supply circuit (this can also be understood as output of the circuit 3a or as power consumption of the load 4) and leakage current in the nonconductive mode, the discontinuous mode, the critical mode, and the continuous mode. It is found that the leakage current is smaller in the nonconductive mode than in the discontinuous mode, smaller in the discontinuous mode than in the critical mode, and smaller in the critical mode than in the continuous mode even when the magnitude of the output is changed. It is also found that the leakage current decreases with increasing output in a wide area.

By switching, as shown in a thick line, the operating mode of the circuit 3a depending on the magnitude of the output, the leakage current can be maintained to be lower than a threshold shown in an alternate long and short dash line regardless of the magnitude of the output.

This can be understood as desirable effects in terms of bringing about reduction of a circuit scale of the leakage current reduction device 6, or further omission of the leakage current reduction device 6.

Specifically, as the operating mode of the circuit 3a, the nonconductive mode is adopted when the output is smaller than a threshold P11, the discontinuous mode is adopted when the output is between the threshold P11 and a threshold P21 (>P11), the critical mode is adopted when the output is between the threshold P21 and a threshold P31 (>P21), and the continuous mode is adopted when the output is larger than the threshold P31. As a result, an increase in leakage current is further suppressed in an area in which power consumption of the load 4 is small, compared to the conventional technology.

The thresholds for the output can be selected as follows. As it is desirable that leakage current be small regardless of output, output in the discontinuous mode, output in the critical mode, and output in the continuous mode when the leakage current has a certain magnitude should be known in advance as the thresholds P11, P21, and P31, respectively. In other words, in the switching power supply circuit, magnitude of leakage current when the output takes the threshold P11 in a case of adopting the discontinuous mode, the magnitude of leakage current when the output takes the threshold P21 in a case of adopting the critical mode, and the magnitude of leakage current when the output takes the threshold P31 in a case of adopting the continuous mode are equal to one another (see the alternate long and short dash line in FIG. 7).

Figure 8:
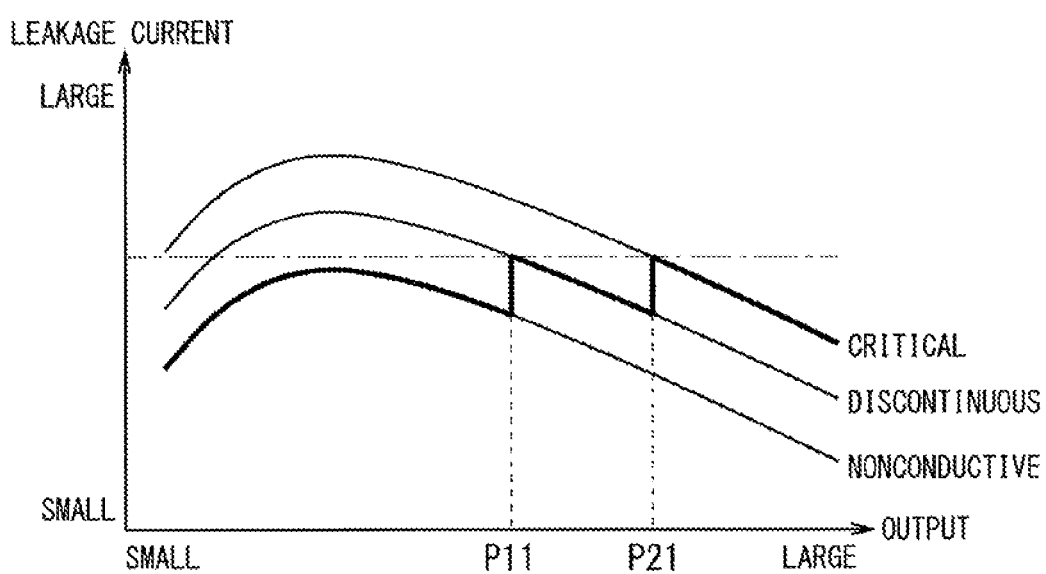
FIG. 8 is a graph showing a relationship between output and leakage current in the nonconductive mode, the discontinuous mode, and the critical mode in Embodiment 1.

FIG. 8 is a graph showing a relationship between output of the switching power supply circuit and leakage current in the nonconductive mode, the discontinuous mode, and the critical mode.

As the operating mode of the circuit 3a, the nonconductive mode is adopted when the output is smaller than the threshold P11, the discontinuous mode is adopted when the output is between the threshold P11 and the threshold P21 (>P11), and the critical mode is adopted when the output is larger than the threshold P21. As a result, an increase in leakage current is further suppressed in the area in which the power consumption of the load 4 is small, compared to the conventional technology.

The thresholds for the output can be selected as follows. In the switching power supply circuit, the magnitude of leakage current when the output takes the threshold P11 in a case of adopting the discontinuous mode and the magnitude of leakage current when the output takes the threshold P21 in a case of adopting the critical mode are equal to each other (see an alternate long and short dash line in FIG. 8).

Figure 9:
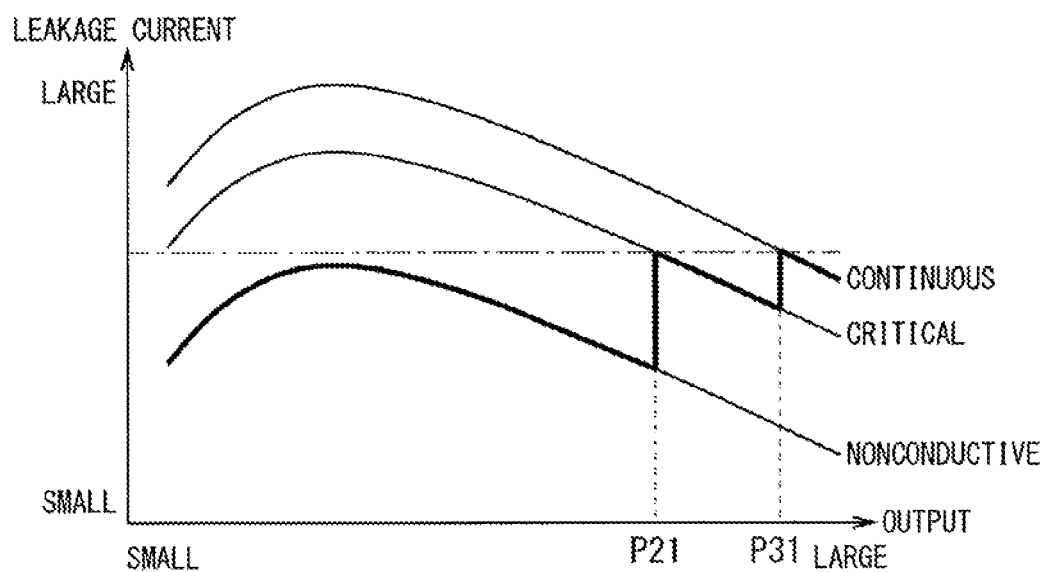
FIG. 9 is a graph showing a relationship between output and leakage current in the nonconductive mode, the critical mode, and the continuous mode in Embodiment 1.

FIG. 9 is a graph showing a relationship between output of the switching power supply circuit and leakage current in the nonconductive mode, the critical mode, and the continuous mode.

As the operating mode of the circuit 3a, the nonconductive mode is adopted when the output is smaller than the threshold P21, the critical mode is adopted when the output is between the threshold P21 and the threshold P31 (>P21), and the continuous mode is adopted when the output is larger than the threshold P31. As a result, an increase in leakage current is further suppressed in the area in which the power consumption of the load 4 is small, compared to the conventional technology.

The thresholds for the output can be selected as follows. In the switching power supply circuit, the magnitude of leakage current when the output takes the threshold P21 in a case of adopting the critical mode and the magnitude of leakage current when the output takes the threshold P31 in a case of adopting the continuous mode are equal to each other (see an alternate long and short dash line in FIG. 9).

Figure 10:
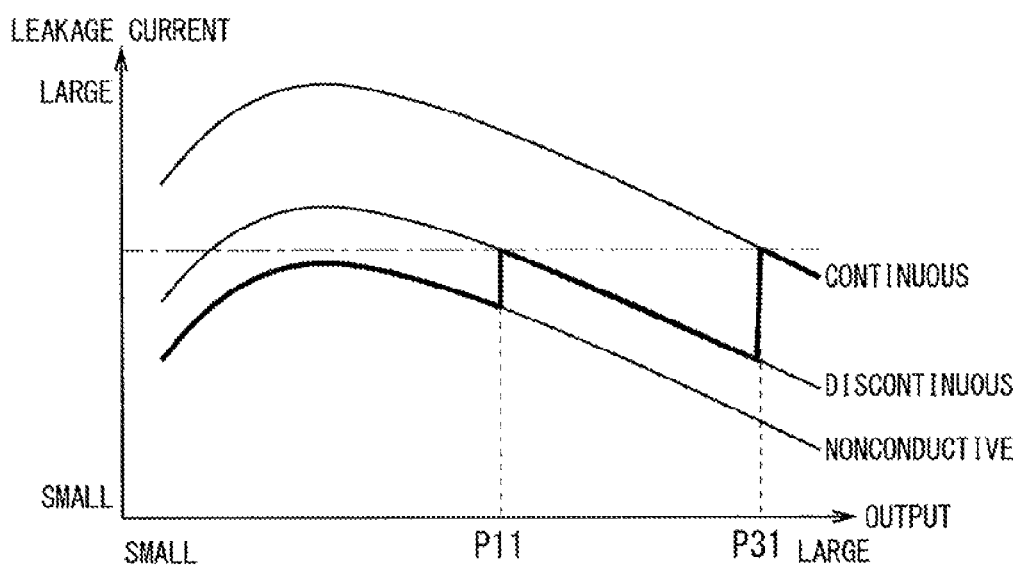
FIG. 10 is a graph showing a relationship between output and leakage current in the nonconductive mode, the discontinuous mode, and the continuous mode in Embodiment 1.

FIG. 10 is a graph showing a relationship between output of the switching power supply circuit and leakage current in the nonconductive mode, the discontinuous mode, and the continuous mode.

As the operating mode of the circuit 3a, the nonconductive mode is adopted when the output is smaller than the threshold P11, the discontinuous mode is adopted when the output is between the threshold P11 and the threshold P31 (>P11), and the continuous mode is adopted when the output is larger than the threshold P31. As a result, an increase in leakage current is further suppressed in the area in which the power consumption of the load 4 is small, compared to the conventional technology.

The thresholds for the output can be selected as follows. In the switching power supply circuit, the magnitude of the leakage current when the output takes the threshold P11 in a case of adopting the discontinuous mode and the magnitude of leakage current when the output takes the threshold P31 in a case of adopting the continuous mode are equal to each other (see an alternate long and short dash line in FIG. 10).

Since switching of the mode among the discontinuous mode, the critical mode, and the continuous mode is known as described above, operations in the present embodiment can be summarized as follows.

(1a) When the power consumption of the load 4 is smaller than a first threshold, the switch element S1 in the circuit 3a is made nonconductive, and power is supplied from the circuit 3a to the load 4.

(1b) When the power consumption of the load 4 is larger than the first threshold, the switch element S1 of the circuit 3a is made intermittently conductive, and power is supplied from the circuit 3a to the load 4.

(1c) The first threshold in (1a) and (1b) above is the power consumption of the load 4 (the threshold P11 in the examples of FIGS. 7, 8, and 10, and P21 in the example of FIG. 9) when leakage current takes a threshold (shown in the alternate long and short dash lines in FIGS. 7 to 10) in a mode (the discontinuous mode is the examples of FIGS. 7, 8, and 10, and the critical mode in the example of FIG. 9) in which the leakage current is the smallest from among modes in which the switch element S1 is intermittently conductive and which are adopted in the switching power supply circuit.

Figure 11:
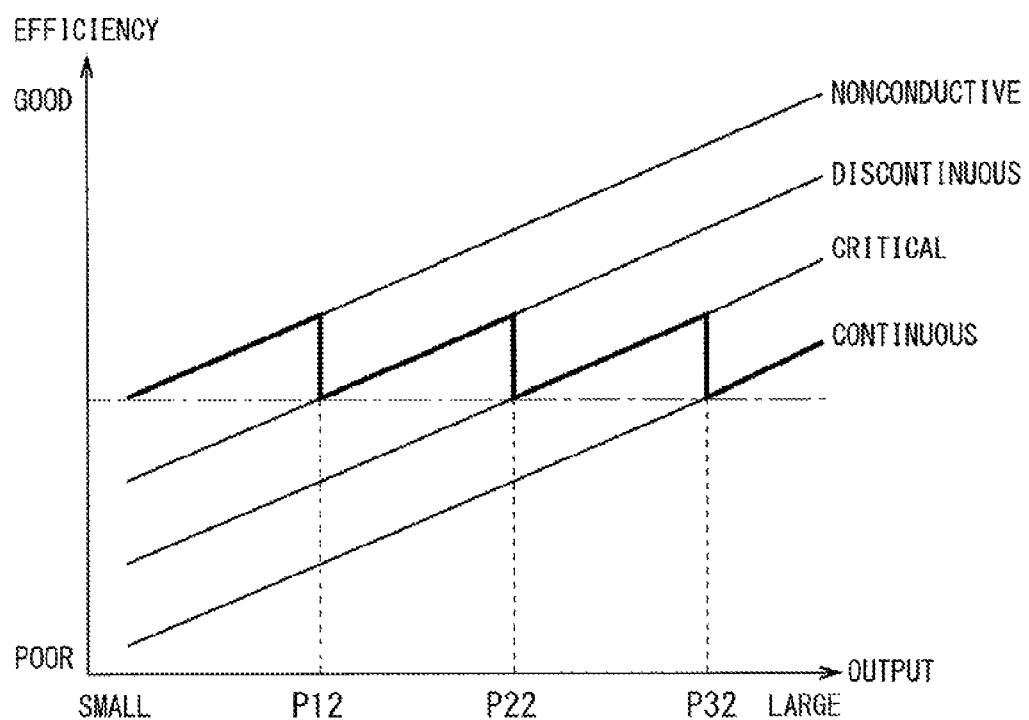
FIGS. 11 and 12 are graphs showing a relationship between output and efficiency in the nonconductive mode, the discontinuous mode, the critical mode, and the continuous mode in Embodiment 1.
Figure 12:
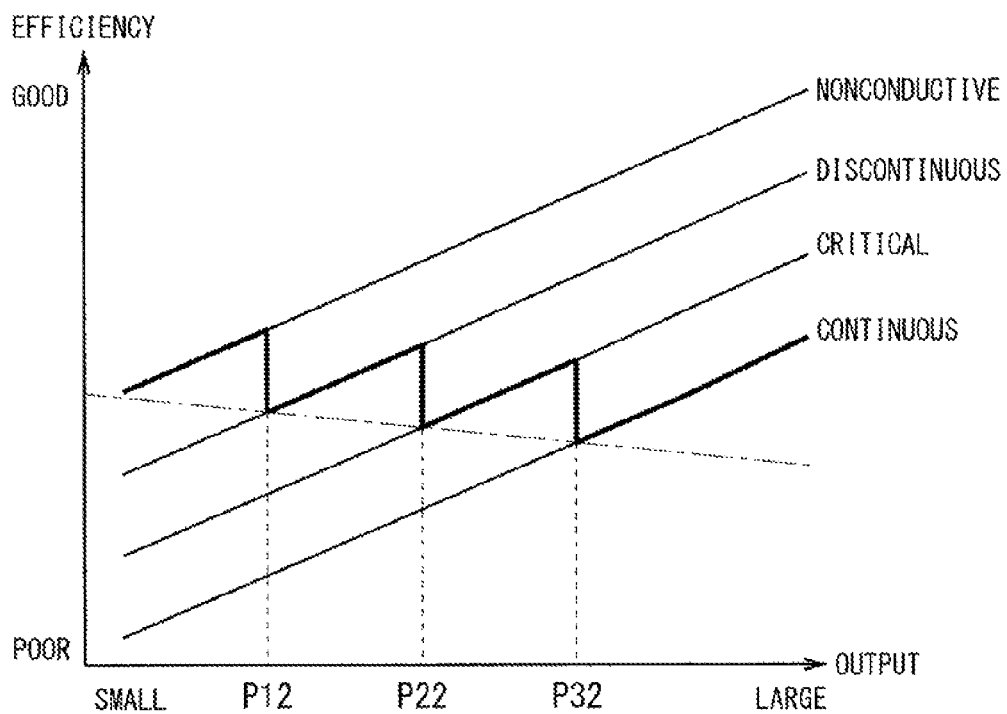

FIGS. 11 and 12 are each a graph showing a relationship between output of the switching power supply circuit and efficiency in the nonconductive mode, the discontinuous mode, the critical mode, and the continuous mode. It is found that efficiency is higher in the nonconductive mode than in the discontinuous mode, higher in the discontinuous mode than in the critical mode, and higher in the critical mode than in the continuous mode even if the magnitude of the output is changed. By switching, as shown in a thick line, the operating mode of the circuit 3a depending on the magnitude of the output, reduction of efficiency below a threshold shown in an alternate long and short dash line is suppressed regardless of the magnitude of the output.

Specifically, as the operating mode of the circuit 3a, the nonconductive mode is adopted when the output is smaller than a threshold P12, the discontinuous mode is adopted when the output is between the threshold P12 and a threshold P22 (>P12), the critical mode is adopted when the output is between the threshold P22 and a threshold P32 (>P22), and the continuous mode is adopted when the output is larger than the threshold P32. As a result, reduction of efficiency is further suppressed in the area in which power consumption of the load 4 is small, compared to the conventional technology.

In FIG. 11, in the switching power supply circuit, efficiency in a case of adopting the discontinuous mode when the output takes the threshold P12, efficiency in a case of adopting the critical mode when the output takes the threshold P22, and efficiency in a case of adopting the continuous mode when the output takes the threshold P32 are equal to one another (see the alternate long and short dash line in FIG. 11).

The efficiency, however, should sometimes be evaluated as for an area in which the power consumption of the load 4 is frequently taken. In the case of an air conditioner, for example, an annual performance factor (APF) is often used in efficiency calculation. The APF is roughly calculated by dividing the sum of air conditioning performance as developed by the sum of power consumption. Importance is thus placed on efficiency in power consumption achieved for a long time.

In air conditioners, power consumption usually becomes large only in an initial stage of an operation, and efficiency during an operation with a small power consumption is important in the APF. This means that the threshold for efficiency may increase as decreasing power consumption. Seeing this generally, at least any two of efficiency in a case of adopting the discontinuous mode when the power consumption of the load 4 is the threshold P12, efficiency in a case of adopting the critical mode when the power consumption of the load 4 is the threshold P22, and efficiency in a case of adopting the continuous mode when the power consumption of the load 4 is the threshold P32 may be different from each other.

The majority of power consumption of air conditioners is power consumption offered by inverters. FIG. 12 shows, as examples of the thresholds P12, P22, and P32 desirable in the above-mentioned air conditioners, a case where efficiency of the switching power supply circuit is lower in a case of adopting the critical mode when the output takes the threshold P22 than in a case of adopting the discontinuous mode when the output takes the threshold P12, and is lower in a case of adopting the continuous mode when the output takes the threshold P32 than in a case of adopting the critical mode when the output takes the threshold P22. That is to say, a case where the threshold for efficiency decreases with increasing power consumption is shown in the alternate long and short dash line in FIG. 12.

Figure 13:
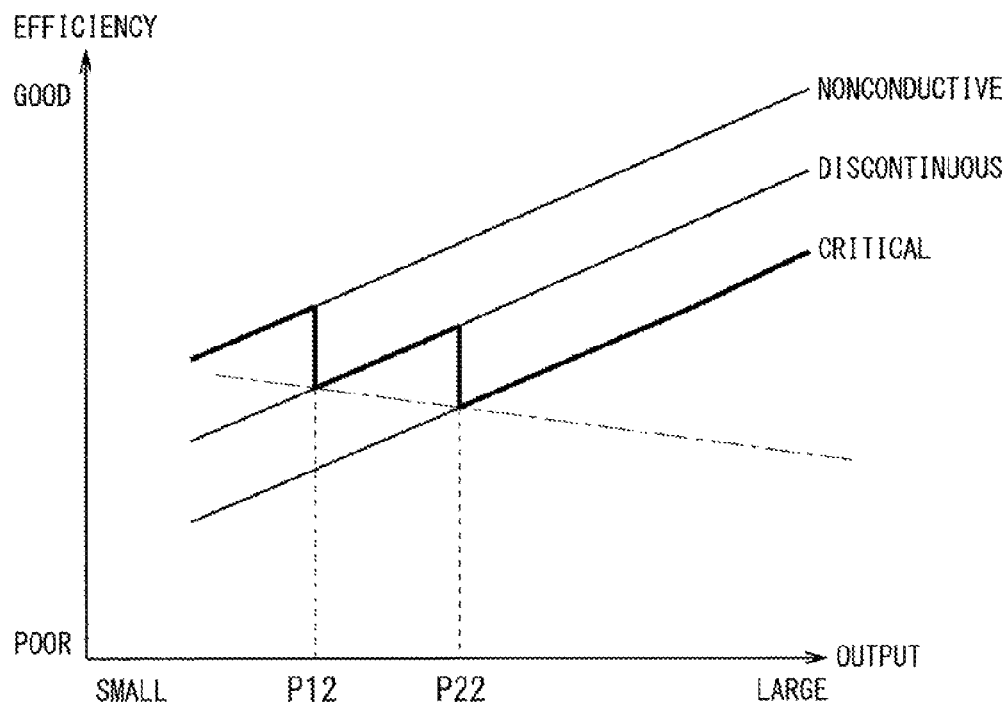
FIG. 13 is a graph showing a relationship between output and efficiency in the nonconductive mode, the discontinuous mode, and the critical mode in Embodiment 1.

FIG. 13 is a graph showing a relationship between output of the switching power supply circuit and leakage current in the nonconductive mode, the discontinuous mode, and the critical mode.

As the operating mode of the circuit 3a, the nonconductive mode is adopted when the output is smaller than the threshold P12, the discontinuous mode is adopted when the output is between the threshold P12 and the threshold P22 (>P12), and the critical mode is adopted when the output is larger than the threshold P22. As a result, reduction of efficiency is further suppressed in the area in which power consumption of the load 4 is small, compared to the conventional technology.

The thresholds for the output can be selected as follows. In the switching power supply circuit, efficiency when the output takes the threshold P12 in a case of adopting the discontinuous mode and efficiency when the output takes the threshold P22 in a case of adopting the critical mode are different from each other. More specifically, in the switching power supply circuit, the efficiency when the output takes the threshold P12 in a case of adopting the discontinuous mode is higher than the efficiency when the output takes the threshold P22 in a case of adopting the critical mode (see an alternate long and short dash line in FIG. 13).

Figure 14:
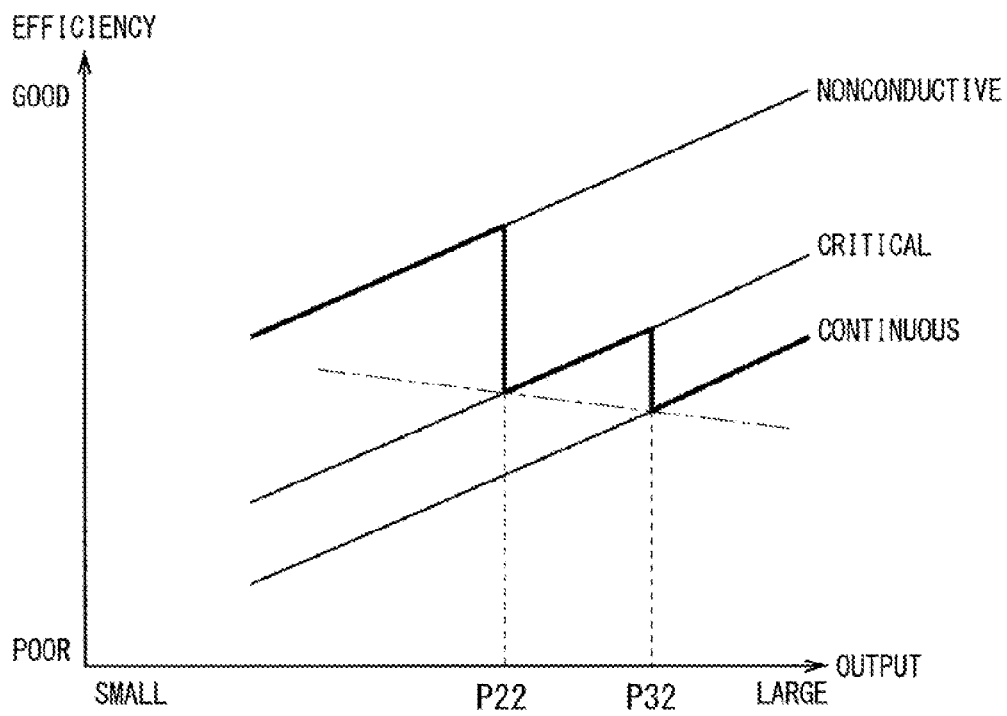
FIG. 14 is a graph showing a relationship between output and efficiency in the nonconductive mode, the critical mode, and the continuous mode in Embodiment 1.

FIG. 14 is a graph showing a relationship between output of the switching power supply circuit and leakage current in the nonconductive mode, the critical mode, and the continuous mode.

As the operating mode of the circuit 3a, the nonconductive mode is adopted when the output is smaller than the threshold P22, the critical mode is adopted when the output is between the threshold P22 and the threshold P32 (>P22), and the continuous mode is adopted when the output is larger than the threshold P32. As a result, reduction of efficiency is further suppressed in the area in which power consumption of the load 4 is small, compared to the conventional technology.

The thresholds for the output can be selected as follows. In the switching power supply circuit, efficiency when the output takes the threshold P22 in a case of adopting the critical mode and efficiency when the output takes the threshold P32 in a case of adopting the continuous mode are different from each other. More specifically, in the switching power supply circuit, the efficiency when the output takes the threshold P22 in a case of adopting the critical mode is higher than the efficiency when the output takes the threshold P32 in a case of adopting the continuous mode (see an alternate long and short dash line in FIG. 14).

Figure 15:
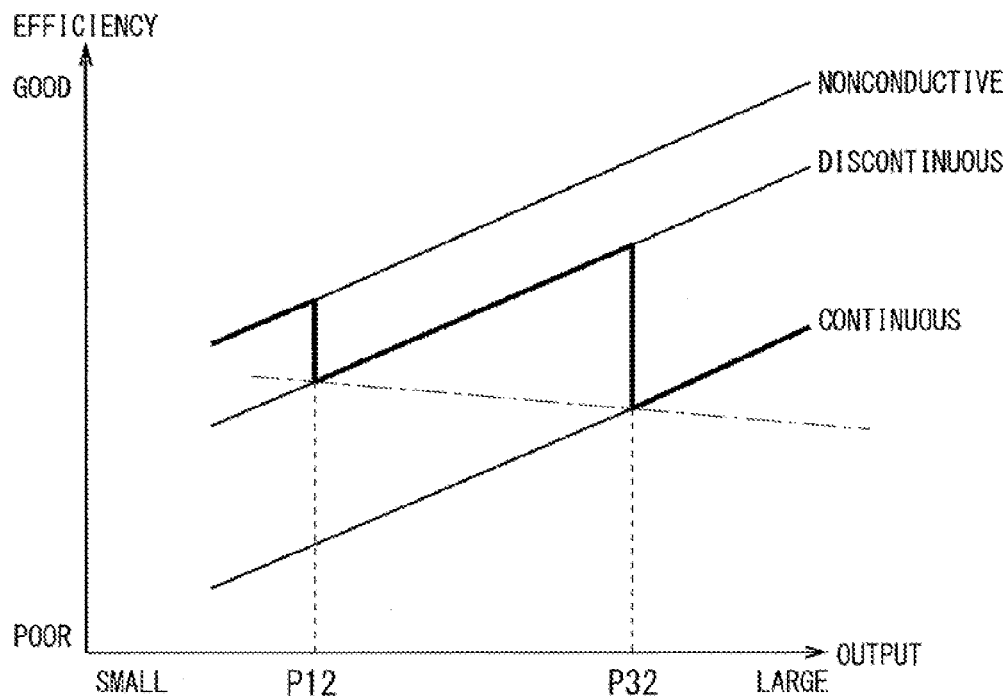
FIG. 15 is a graph showing a relationship between output and efficiency in the nonconductive mode, the discontinuous mode, and the continuous mode in Embodiment 1.

FIG. 15 is a graph showing a relationship between output of the switching power supply circuit and leakage current in the nonconductive mode, the discontinuous mode, and the continuous mode.

As the operating mode of the circuit 3a, the nonconductive mode is adopted when the output is smaller than the threshold P12, the discontinuous mode is adopted when the output is between the threshold P12 and the threshold P32 (>P12), and the continuous mode is adopted when the output is larger than the threshold P32. As a result, reduction of efficiency is further suppressed in the area in which power consumption of the load 4 is small, compared to the conventional technology.

The thresholds for the output can be selected as follows. In the switching power supply circuit, efficiency when the output takes the threshold P12 in a case of adopting the discontinuous mode and efficiency when the output takes the threshold P32 in a case of adopting the continuous mode are different from each other. More specifically, in the switching power supply circuit, the efficiency when the output takes the threshold P12 in a case of adopting the discontinuous mode is higher than the efficiency when the output takes the threshold P32 in a case of adopting the continuous mode (see an alternate long and short dash line in FIG. 15).

As with the above-mentioned operations (1a), (1b), and (1c), switching of an operation of the circuit 3a shown in thick lines in FIGS. 11 to 15 can be summarized as follows.

(2a) When the power consumption of the load 4 is smaller than a first threshold, the switch element S1 in the circuit 3a is made nonconductive, and power is supplied from the circuit 3a to the load 4.

(2b) When the power consumption of the load 4 is larger than the first threshold, the switch element S1 of the circuit 3a is made intermittently conductive, and power is supplied from the circuit 3a to the load 4.

(2c) The first threshold in (2a) and (2b) above is the power consumption of the load 4 (the threshold P12 in the examples of FIGS. 11, 12, 13, and 15, and P22 in the example of FIG. 14) when leakage current has a threshold (shown in the alternate long and short dash lines in FIGS. 11 to 15) in a mode (the discontinuous mode in the examples of FIGS. 11, 12, 13, and 15, and the critical mode in the example of FIG. 14) in which the efficiency is the highest (best) from among modes in which the switch element S1 is intermittently conductive and which are adopted in the switching power supply circuit.

Figure 16:
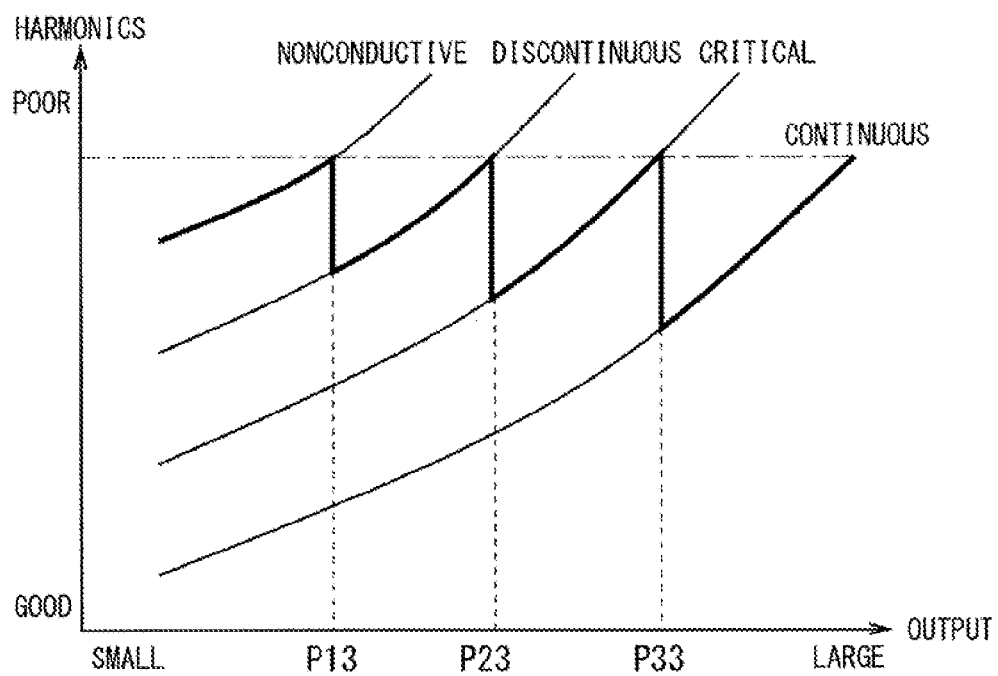
FIG. 16 is a graph showing a relationship between output and harmonics in the nonconductive mode, the discontinuous mode, the critical mode, and the continuous mode in Embodiment 1.

FIG. 16 is a graph showing a relationship between output of the switching power supply circuit and harmonics in the nonconductive mode, the discontinuous mode, the critical mode, and the continuous mode. It is found that the harmonics are larger (poorer) in the nonconductive mode than in the discontinuous mode, larger in the discontinuous mode than in the critical mode, and larger in the critical mode than in the continuous mode even if the magnitude of the output is changed. However, harmonics are reduced (improved) with decreasing power consumption of the load 4 in each of the operating modes.

By switching, as shown in a thick line, the operating mode of the circuit 3a depending on the magnitude of the output, an increase in harmonics above a threshold shown in an alternate long and short dash line is suppressed regardless of the magnitude of the output.

Specifically, as the operating mode of the circuit 3a, the nonconductive mode is adopted when the output is smaller than a threshold P13, the discontinuous mode is adopted when the output is between the threshold P13 and a threshold P23 (>P13), the critical mode is adopted when the output is between the threshold P23 and a threshold P33 (>P23), and the continuous mode is adopted when the output is larger than the threshold P33. As a result, an operating mode with a small leakage current or a high efficiency is adopted while further suppressing an increase in harmonics in the area in which the power consumption of the load 4 is small, compared to the conventional technology.

As it is desirable that harmonics be also small regardless of output, output in the nonconductive mode, output in the discontinuous mode, and output in the critical mode when the harmonics have a certain magnitude should be known in advance as the thresholds P13, P23, and P33, respectively. In other words, in the switching power supply circuit, the magnitude of harmonics when the power consumption of the load 4 takes the threshold P13 in a case of adopting the nonconductive mode, the magnitude of harmonics when the power consumption of the load 4 takes the threshold P23 in a case of adopting the discontinuous mode, and the magnitude of harmonics when the power consumption of the load 4 takes the threshold P33 in a case of adopting the critical mode are equal to one another (see the alternate long and short dash line in FIG. 16).

Figure 17:
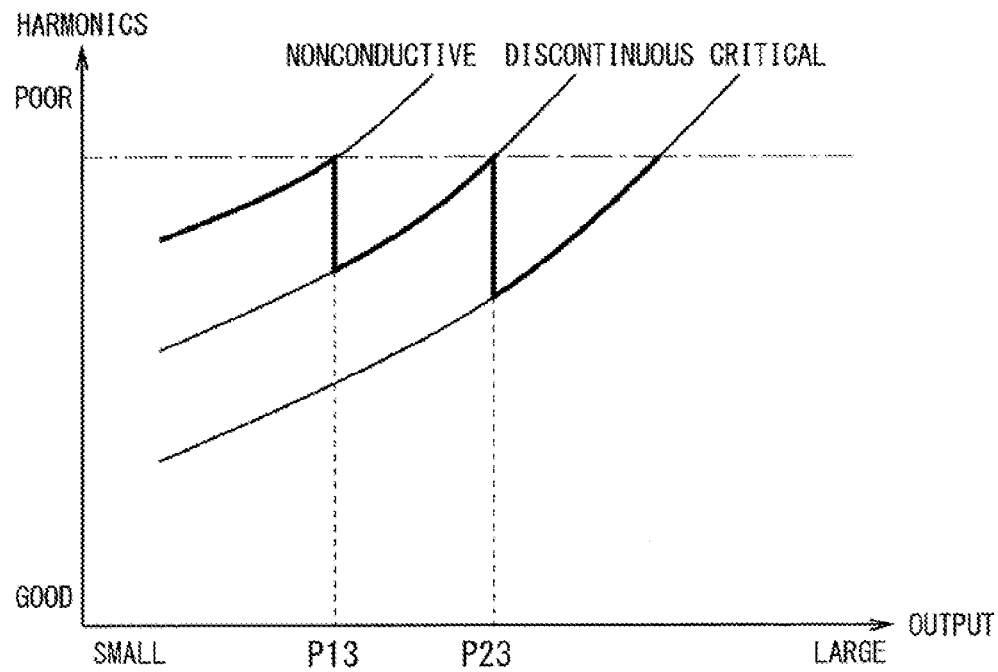
FIG. 17 is a graph showing a relationship between output and harmonics in the nonconductive mode, the discontinuous mode, and the critical mode in Embodiment 1.

FIG. 17 is a graph showing a relationship between output of the switching power supply circuit and harmonics in the nonconductive mode, the discontinuous mode, and the critical mode.

As the operating mode of the circuit 3a, the nonconductive mode is adopted when the output is smaller than the threshold P13, the discontinuous mode is adopted when the output is between the threshold P13 and the threshold P23 (>P13), and the critical mode is adopted when the output is larger than the threshold P23. As a result, an operating mode with a small leakage current or a high efficiency is adopted while suppressing harmonics in the area in which the power consumption of the load 4 is small, compared to the conventional technology.

The thresholds for the output can be selected as follows. In the switching power supply circuit, the magnitude of harmonics when the output takes the threshold P13 in a case of adopting the nonconductive mode and the magnitude of harmonics when the output takes the threshold P23 in a case of adopting the discontinuous mode are equal to each other (see an alternate long and short dash line in FIG. 17).

Figure 18:
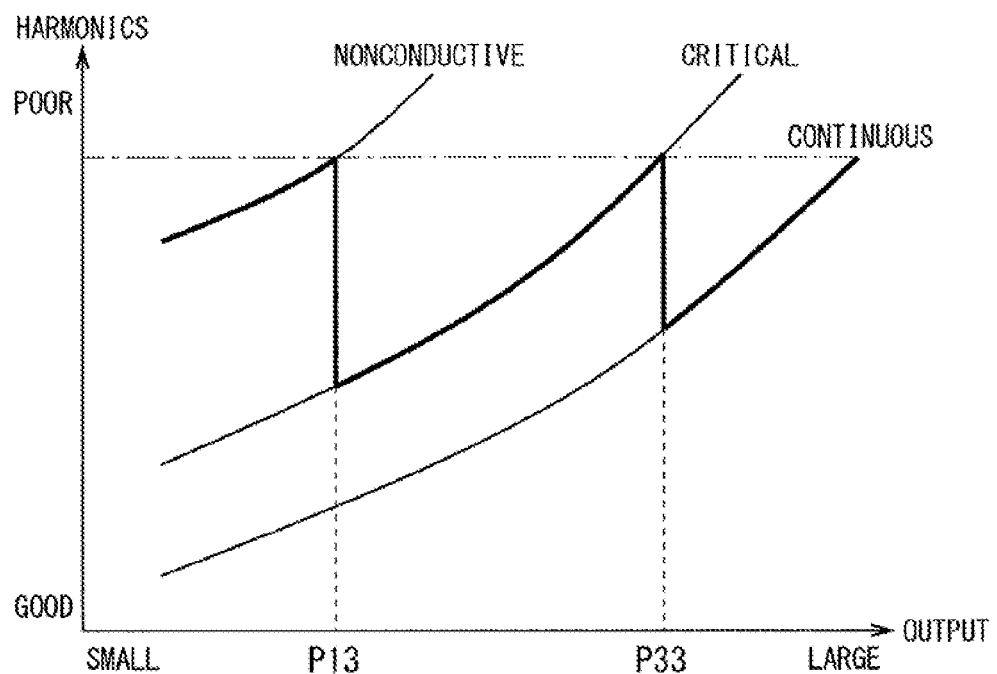
FIG. 18 is a graph showing a relationship between output and harmonics in the nonconductive mode, the critical mode, and the continuous mode in Embodiment 1.

FIG. 18 is a graph showing a relationship between output of the switching power supply circuit and harmonics in the nonconductive mode, the critical mode, and the continuous mode.

As the operating mode of the circuit 3a, the nonconductive mode is adopted when the output is smaller than the threshold P13, the critical mode is adopted when the output is between the threshold P13 and the threshold P33 (>P13), and the continuous mode is adopted when the output is larger than the threshold P33. As a result, an operating mode with a small leakage current or a high efficiency is adopted while suppressing harmonics in the area in which the power consumption of the load 4 is small, compared to the conventional technology.

The thresholds for the output can be selected as follows. In the switching power supply circuit, the magnitude of harmonics when the output takes the threshold P13 in a case of adopting the nonconductive mode and the magnitude of harmonics when the output takes the threshold P33 in a case of adopting the critical mode are equal to each other (see an alternate long and short dash line in FIG. 18).

Figure 19:
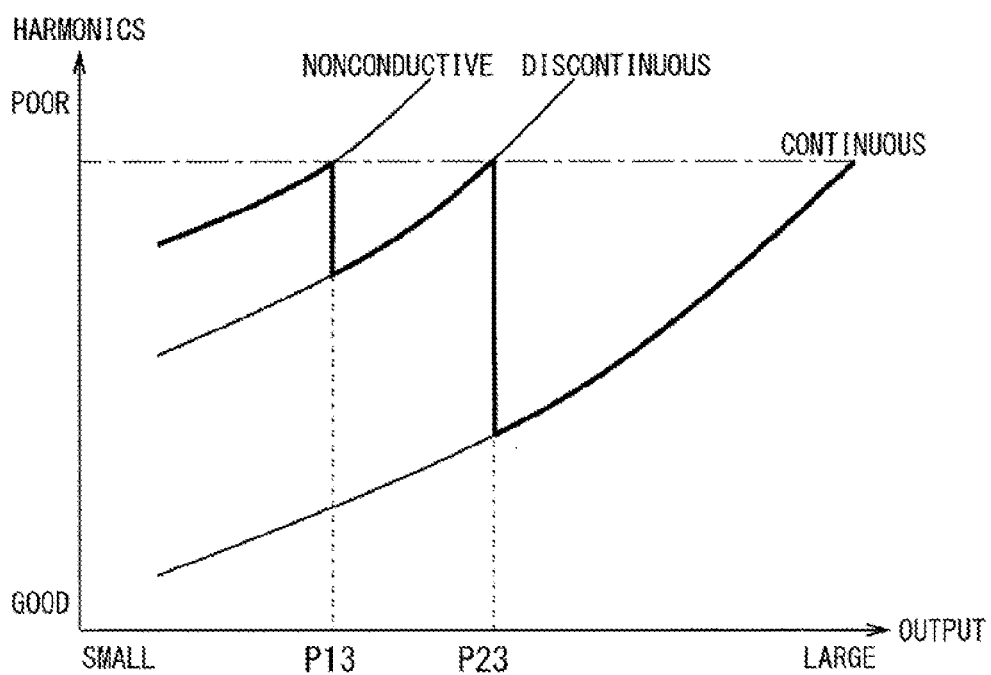
FIG. 19 is a graph showing a relationship between output and harmonics in the nonconductive mode, the discontinuous mode, and the continuous mode in Embodiment 1.

FIG. 19 is a graph showing a relationship between output of the switching power supply circuit and harmonics in the nonconductive mode, the discontinuous mode, and the continuous mode.

As the operating mode of the circuit 3a, the nonconductive mode is adopted when the output is smaller than the threshold P13, the discontinuous mode is adopted when the output is between the threshold P13 and the threshold P23 (>P13), and the continuous mode is adopted when the output is larger than the threshold P23. As a result, an operating mode with a small leakage current or a high efficiency is adopted while suppressing harmonics in the area in which the power consumption of the load 4 is small, compared to the conventional technology.

The thresholds for the output can be selected as follows. In the switching power supply circuit, the magnitude of harmonics when the output takes the threshold P13 in a case of adopting the nonconductive mode and the magnitude of harmonics when the output takes the threshold P23 in a case of adopting the discontinuous mode are equal to each other (see an alternate long and short dash line in FIG. 19).

As with the above-mentioned operations (1a), (1b), and (1c), switching of an operation of the circuit 3a shown in thick lines in FIGS. 16 to 19 can be summarized as follows.

(3a) When the power consumption of the load 4 is smaller than a first threshold, the switch element S1 in the circuit 3a is made nonconductive, and power is supplied from the circuit 3a to the load 4.

(3b) When the power consumption of the load 4 is larger than the first threshold, the switch element S1 of the circuit 3a is made intermittently conductive, and power is supplied from the circuit 3a to the load 4.

(3c) The first threshold in (3a) and (3b) above is the power consumption of the load 4 (the threshold P13 in the examples of FIGS. 16 to 19) when harmonics have a threshold (shown in the alternate long and short dash lines in FIGS. 16 to 19) in a mode in which the switch element S1 is nonconductive.

Embodiment 2

The following describes an operation in a case where not only the circuit 3a but also the circuit 3b are used. As indicated in International Publication No. 2010/023978 and Japanese Patent Application Laid-Open No. 2011-223865, an operation in an interleaved method can be performed with use of both of the circuits 3a and 3b in the present embodiment. In such an interleaved method, both of the circuits 3a and 3b usually operate in the critical mode. An operating mode in such an interleaved method is hereinafter provisionally referred to as a "critical (two-phase) mode" after both of the circuits 3a and 3b operating in the critical mode. There is an area of output in which the circuits 3a and 3b operate in the "critical (two-phase) mode" as described later. That is to say, the circuits 3a and 3b can perform an operation in an interleaved method.

Similarly, an operating mode in a case where both of the circuits 3a and 3b operate in the continuous mode is hereinafter provisionally referred to as a "continuous (two-phase) mode". An operating mode in a case where both of the circuits 3a and 3b operate in the discontinuous mode is hereinafter provisionally referred to as a "discontinuous (two-phase) mode".

On the other hand, an operating mode in a case where only one of the circuits 3a and 3b operates in the critical mode and the other one of the circuits 3a and 3b operates in the nonconductive mode is hereinafter provisionally referred to as a "critical (one-phase) mode". Similarly, an operating mode in a case where only one of the circuits 3a and 3b operates in the continuous mode and the other one of the circuits 3a and 3b operates in the nonconductive mode is hereinafter provisionally referred to as a "continuous (one-phase) mode". Similarly, an operating mode in a case where only one of the circuits 3a and 3b operates in the discontinuous mode and the other one of the circuits 3a and 3b operates in the nonconductive mode is hereinafter provisionally referred to as a "discontinuous (one-phase) mode".

An operating mode in a case where both of the circuits 3a and 3b operate in the nonconductive mode is simply treated as a "nonconductive mode", for convenience's sake.

As described with use of FIG. 7, leakage current is smaller in the nonconductive mode than in any other operating modes (i.e., the discontinuous mode, the critical mode, and the continuous mode). Therefore, the leakage current increases in the order of the lower leakage current; the nonconductive mode, the discontinuous (one-phase) mode, the discontinuous (two-phase) mode, the critical (one-phase) mode, the critical (two-phase) mode, the continuous (one-phase) mode, and the continuous (two-phase) mode, in principle.

As described above, however, the critical (two-phase) mode is an operation of a so-called interleaved method. Leakage current can thus be larger in the critical (two-phase) mode than in the continuous (one-phase) mode, depending on the switching frequency in the critical mode. Thus, in the following description, the continuous (one-phase) mode and the critical (two-phase) mode may be swapped in the above-mentioned order.

In addition, the above-mentioned order is the same as the order of operating modes arranged in descending order of efficiency and the order of operating modes arranged in descending order of magnitude (poorness) of harmonics, as can be understood from the description with use of FIGS. 12 and 16.

Figure 20:
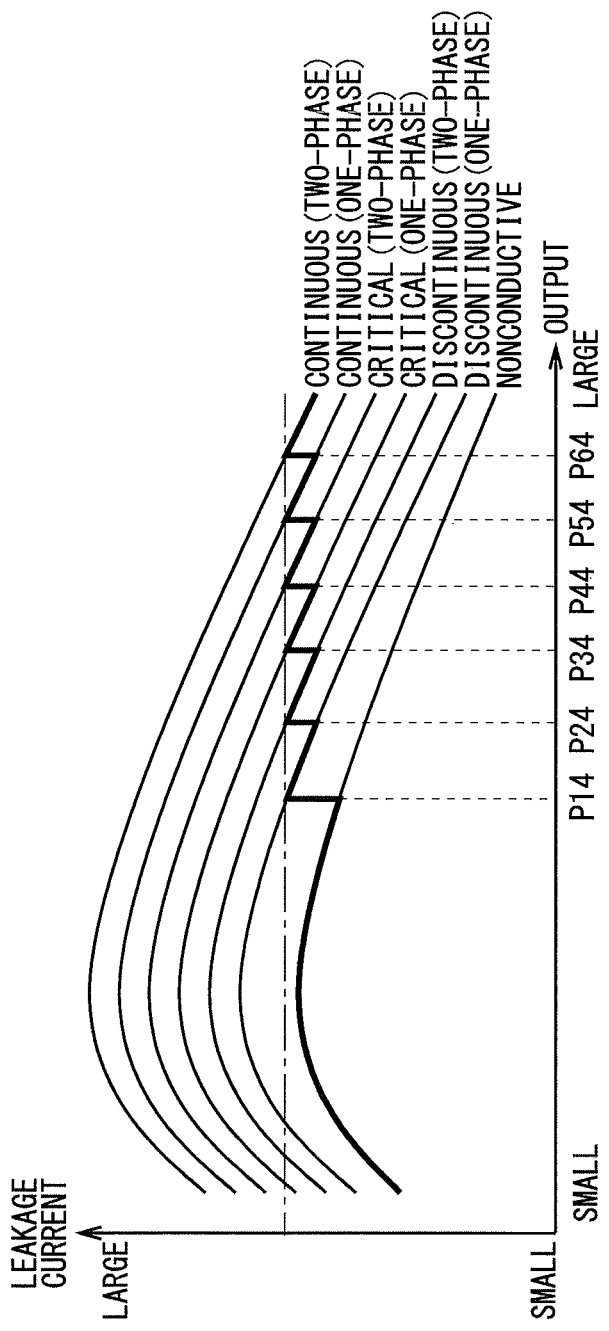
FIG. 20 is a graph showing a relationship between output and leakage current in the nonconductive mode, the discontinuous mode, the critical mode, and the continuous mode in Embodiment 2.

FIG. 20 is a graph showing a relationship between output of the switching power supply circuit (this can also be understood as output of both of the circuits 3a and 3b as well as power consumption of the load 4) and leakage current in various operating modes of the circuits 3a and 3b. By switching, as shown in a thick line, the operating mode of the circuits 3a and 3b depending on the magnitude of the output, the leakage current is maintained to be lower than a threshold shown in an alternate long and short dash line regardless of the magnitude of the output.

Specifically, as the operating mode of the circuits 3a and 3b, the nonconductive mode is adopted when the output is smaller than a threshold P14, the discontinuous (one-phase) mode is adopted when the output is between the threshold P14 and a threshold P24 (>P14), the discontinuous (two-phase) mode is adopted when the output is between the threshold P24 and a threshold P34 (>P24), the critical (one-phase) mode is adopted when the output is between the threshold P34 and a threshold P44 (>P34), the critical (two-phase) mode is adopted when the output is between the threshold P44 and a threshold P54 (>P44), the continuous (one-phase) mode is adopted when the output is between the threshold P54 and a threshold P64 (>P54), and the continuous (two-phase) mode is adopted when the output is larger than the threshold P64. As a result, an increase in leakage current is further suppressed in the area in which the power consumption of the load 4 is small, compared to the conventional technology.

The thresholds for the output can be selected as follows. As it is desirable that leakage current be small regardless of output, output in the discontinuous (one-phase) mode, output in the discontinuous (two-phase) mode, output in the critical (one-phase) mode, output in the critical (two-phase) mode, output in the continuous (one-phase) mode, and output in the continuous (two-phase) mode when the leakage current has a certain magnitude should be known in advance as the thresholds P14, P24, P34, P44, P54, and P64, respectively. In other words, in the switching power supply circuit, the magnitude of leakage current when the output takes the threshold P14 in a case of adopting the discontinuous (one-phase) mode, the magnitude of leakage current when the output takes the threshold P24 in a case of adopting the discontinuous (two-phase) mode, the magnitude of leakage current when the output takes the threshold P34 in a case of adopting the critical (one-phase) mode, the magnitude of leakage current when the output takes the threshold P44 in a case of adopting the critical (two-phase) mode, the magnitude of leakage current when the output takes the threshold P54 in a case of adopting the continuous (one-phase) mode, and the magnitude of leakage current when the output takes the threshold P64 in a case of adopting the continuous (two-phase) mode are equal to one another (see the alternate long and short dash line in FIG. 20).

Figure 21:
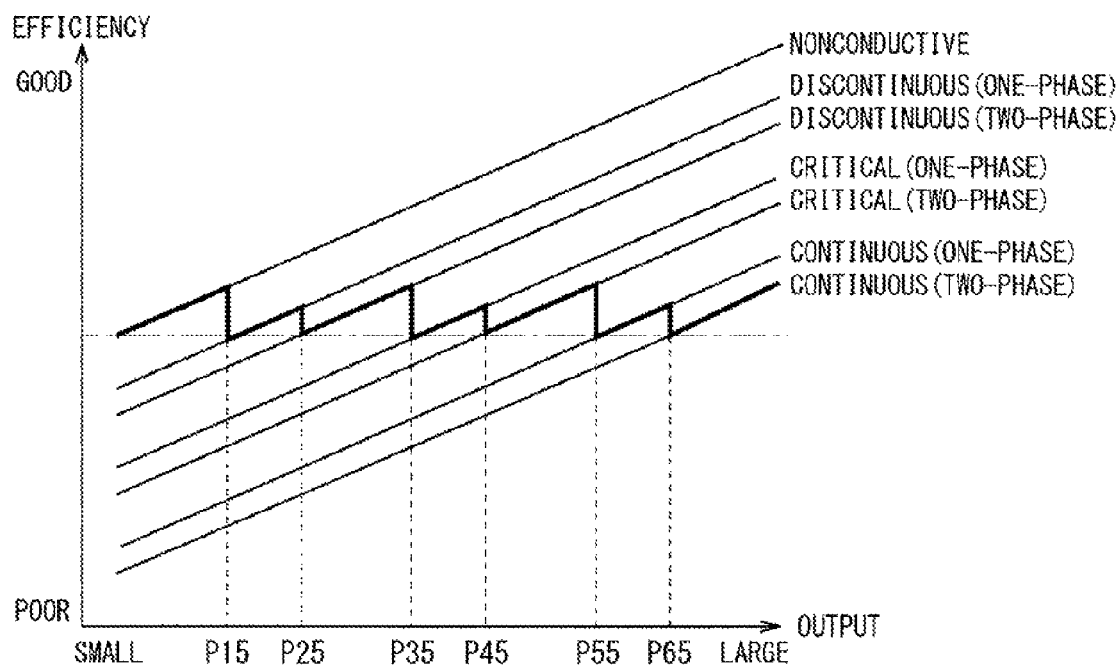
FIGS. 21 and 22 are graphs showing a relationship between output and efficiency in the nonconductive mode, the discontinuous mode, the critical mode, and the continuous mode in Embodiment 2.
Figure 22:
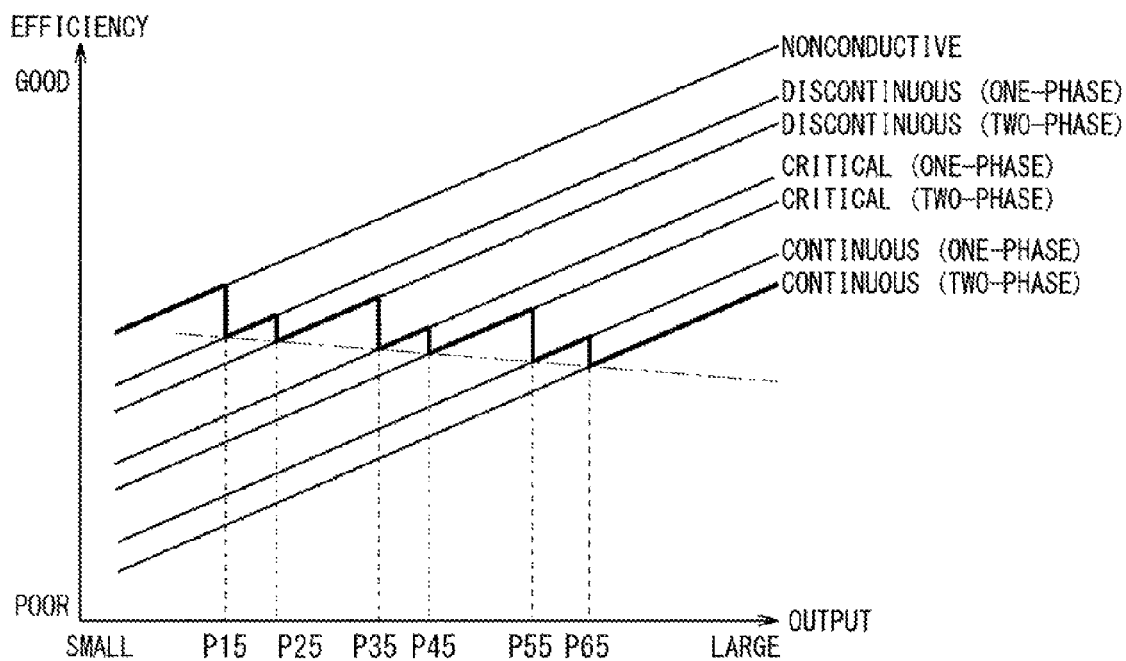

FIGS. 21 and 22 are each a graph showing a relationship between output and efficiency in the various operating modes of the circuits 3a and 3b. By switching, as shown in thick lines, the operating mode of the circuits 3a and 3b depending on the magnitude of the output, efficiency that is higher than thresholds shown in alternate long and short dash lines is obtained regardless of the magnitude of the output.

Specifically, as the operating mode of the circuits 3a and 3b, the nonconductive mode is adopted when the output is smaller than a threshold P15, the discontinuous (one-phase) mode is adopted when the output is between the threshold P15 and a threshold P25 (>P15), the discontinuous (two-phase) mode is adopted when the output is between the threshold P25 and a threshold P35 (>P25), the critical (one-phase) mode is adopted when the output is between the threshold P35 and a threshold P45 (>P35), the critical (two-phase) mode is adopted when the output is between the threshold P45 and a threshold P55 (>P45), the continuous (one-phase) mode is adopted when the output is between the threshold P55 and a threshold P65 (>P55), and the continuous (two-phase) mode is adopted when the output is larger than the threshold P65. As a result, efficiency is further increased in the area in which power consumption of the load 4 is small, compared to the conventional technology.

The thresholds for the output can be selected as follows. In the example shown in FIG. 21, for example, output in the discontinuous (one-phase) mode, output in the discontinuous (two-phase) mode, output in the critical (one-phase) mode, output in the critical (two-phase) mode, output in the continuous (one-phase) mode, and output in the continuous (two-phase) mode when a certain efficiency is obtained should be known in advance as the thresholds P15, P25, P35, P45, P55, and P65, respectively. In other words, in the switching power supply circuit, efficiency when the output takes the threshold P15 in a case of adopting the discontinuous (one-phase) mode, efficiency when the output takes the threshold P25 in a case of adopting the discontinuous (two-phase) mode, efficiency when the output takes the threshold P35 in a case of adopting the critical (one-phase) mode, efficiency when the output takes the threshold P45 in a case of adopting the critical (two-phase) mode, efficiency when the output takes the threshold P55 in a case of adopting the continuous (one-phase) mode, and efficiency when the output takes the threshold P65 in a case of adopting the continuous (two-phase) mode are equal to one another (see the alternate long and short dash line in FIG. 21).

The threshold for efficiency may increase as decreasing power consumption, as described above. Specifically, considered, as examples of the thresholds P15, P25, P35, P45, P55, and P65 desirable in air conditioners, is a case where efficiency of the switching power supply circuit decreases in the following order (see FIG. 22): in a case of adopting the discontinuous (one-phase) mode when the output takes the threshold P15; in a case of adopting the discontinuous (two-phase) mode when the output takes the threshold P25; in a case of adopting the critical (one-phase) mode when the output takes the threshold P35; in a case of adopting the critical (two-phase) mode when the output takes the threshold P45; in a case of adopting the continuous (one-phase) mode when the output takes the threshold P55; and in a case of adopting the continuous (two-phase) mode when the output takes the threshold P65.

A case where the threshold for efficiency decreases with increasing power consumption, as that, is shown in an alternate long and short dash line in FIG. 22.

Figure 23:
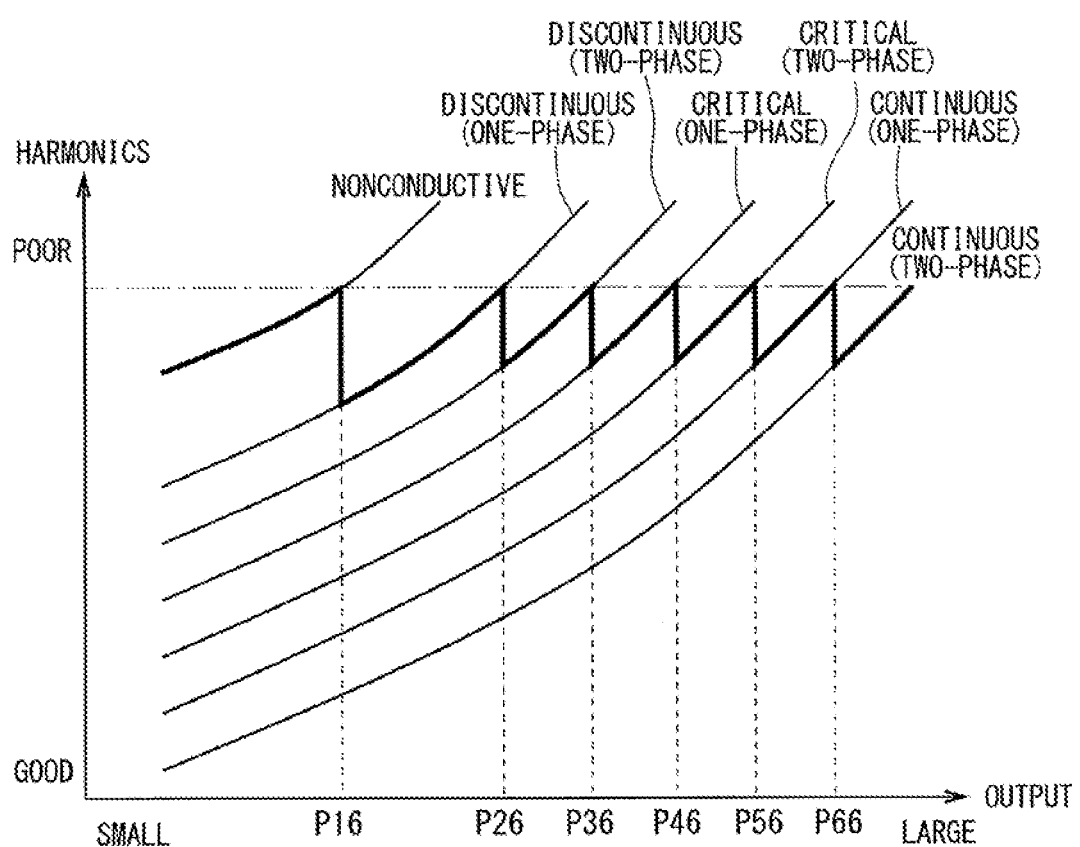
FIG. 23 is a graph showing a relationship between output and harmonics in the nonconductive mode, the discontinuous mode, the critical mode, and the continuous mode in Embodiment 2.

FIG. 23 is a graph showing a relationship between output and harmonics in the various operating modes of the circuits 3a and 3b. By switching, as shown in a thick line, the operating mode of the circuits 3a and 3b depending on the magnitude of the output, the harmonics is maintained to be lower than a threshold shown in an alternate long and short dash line regardless of the magnitude of the output.

Specifically, as the operating mode of the circuits 3a and 3b, the nonconductive mode is adopted when the output is smaller than a threshold P16, the discontinuous (one-phase) mode is adopted when the output is between the threshold P16 and a threshold P26 (>P16), the discontinuous (two-phase) mode is adopted when the output is between the threshold P26 and a threshold P36 (>P26), the critical (one-phase) mode is adopted when the output is between the threshold P36 and a threshold P46 (>P36), the critical (two-phase) mode is adopted when the output is between the threshold P46 and a threshold P56 (>P46), the continuous (one-phase) mode is adopted when the output is between the threshold P56 and a threshold P66 (>P56), and the continuous (two-phase) mode is adopted when the output is larger than the threshold P66. As a result, an operating mode with a small leakage current or a high efficiency is adopted while suppressing harmonics in the area in which the power consumption of the load 4 is small, compared to the conventional technology.

As it is also desirable that harmonics be small regardless of output, output in the nonconductive mode, output in the discontinuous (one-phase) mode, output in the discontinuous (two-phase) mode, output in the critical (one-phase) mode, output in the critical (two-phase) mode, and output in the continuous (one-phase) mode when the harmonics have a certain magnitude should be known in advance as the thresholds P16, P26, P36, P46, P56, and P66, respectively. In other words, in the switching power supply circuit, the magnitude of harmonics when the power consumption of the load 4 takes the threshold P16 in a case of adopting the nonconductive mode, the magnitude of harmonics when the power consumption of the load 4 takes the threshold P26 in a case of adopting the discontinuous (one-phase) mode, the magnitude of harmonics when the power consumption of the load 4 takes the threshold P36 in a case of adopting the discontinuous (two-phase) mode, the magnitude of harmonics when the power consumption of the load 4 takes the threshold P46 in a case of adopting the critical (one-phase) mode, the magnitude of harmonics when the power consumption of the load 4 takes the threshold P56 in a case of adopting the critical (two-phase) mode, and the magnitude of harmonics when the power consumption of the load 4 takes the threshold P66 in a case of adopting the continuous (one-phase) mode are equal to one another (see an alternate long and short dash line in FIG. 23).

Even in a case where a plurality of circuits 3a and 3b are provided as described above, the operating mode of the circuits 3a and 3b can be expressed, as with (1a), (2a), and (3a) above, as follows.

(4a) When the power consumption of the load 4 is smaller than a first threshold (the threshold P14 in FIG. 20, the threshold P15 in FIGS. 21 and 22, and the threshold P16 in FIG. 23), each of the switch elements S1 and S2 of the circuits 3a and 3b (in other words, all of the circuits 3a and 3b) is made nonconductive, and power is supplied from all of the circuits 3a and 3b to the load 4.

In a case where only the circuit 3a is provided, "all of the circuits 3a and 3b" and "each of the circuits 3a and 3b" in (4a) above refer only to the circuit 3a. The expression in (4a) above can be understood so as to include the above-mentioned expressions in (1a) (2a), and (3a) above except for the reference signs.

As with (1 b) (2b), and (3b) above, the operating modes in a case where a plurality of circuits 3a and 3b are provided can be expressed as follows.

(4b) When the power consumption of the load 4 is larger than the first threshold (the threshold P14 in FIG. 20, the threshold P15 in FIGS. 21 and 22, and the threshold P16 in FIG. 23), the switch element S1 (or the switch element S2) of at least one of the circuits 3a and 3b is made intermittently conductive, and power is supplied from all of the circuits 3a and 3b to the load 4.

In a case where only the circuit 3a is provided, "at least one of the circuits 3a and 3b" and "all of the circuits 3a and 3b" in (4b) above refer only to the circuit 3a. The expression in (4b) above can be understood so as to include the above-mentioned expressions in (1 b), (2b), and (3b) above except for the reference signs.

The expression in (4b) above is divided, by the expressions in accordance with the description made with use of FIGS. 20 to 23, as shown below.

(4b1) In a case where the power consumption of the load 4 is larger than the threshold P14 (or the threshold P15 or the threshold P16) and smaller than the threshold P24 (or the threshold P25 or the threshold P26), the switch element S1 (or the switch element S2) of one of the circuits 3a and 3ba is made nonconductive, and the discontinuous mode is adopted as a current mode of the current IL2 (or the current IL1) flowing through the reactor L2 (or the reactor L1) of the other one of the circuits 3a and 3b (discontinuous (one-phase) mode).

(4b2) In a case where the power consumption of the load 4 is larger than the threshold P24 (or the threshold P25 or the threshold P26) and smaller than the threshold P34 (or the threshold P35 or the threshold P36), the discontinuous mode is adopted as the current modes of the currents IL1 and IL2 flowing through the reactors L1 and L2 of the circuits 3a and 3b (discontinuous (two-phase) mode).

(4b3) In a case where the power consumption of the load 4 is larger than the threshold P34 (or the threshold P35 or the threshold P36) and smaller than the threshold P44 (or the threshold P45 or the threshold P46), the switch element S1 (or the switch element S2) of one of the circuits 3a and 3ba is made nonconductive, and the critical mode is adopted as the current mode of the current IL2 (or the current IL1) flowing through the reactor L2 (or the reactor L1) of the other one of the circuits 3a and 3b (critical (one-phase) mode).

(4b4) In a case where the power consumption of the load 4 is larger than the threshold P44 (or the threshold P45 or the threshold P46) and smaller than the threshold P64 (or the threshold P65 or the threshold P66), either one of the following modes is adopted:

(4b4-1) The critical mode is adopted as the current modes of the currents IL1 and IL2 flowing through the reactors L1 and L2 of the circuits 3a and 3b (critical (two-phase) mode);

(4b4-2) The switch element S1 (or the switch element S2) of one of the circuits 3a and 3b is made nonconductive, and the continuous mode is adopted as the current mode of the current IL2 (or the current IL1) flowing through the reactor L2 (or the reactor L1) of the other one of the circuits 3a and 3b (continuous (one-phase) mode).

(4b5) In a case where the power consumption of the load 4 is larger than the threshold P64 (or the threshold P65 or the threshold P66), the continuous mode is adopted as the current modes of the currents IL1 and IL2 flowing through the reactors L1 and L2 in any of the circuits 3a and 3b (critical (two-phase) mode).

(4b4) above is further divided into (4b4-1) and (4b4-2), as the continuous (one-phase) mode and the continuous (two-phase) mode may be swapped in the order depending on the switching frequency in the critical mode.

While the present disclosure has been described in detail, the foregoing description is in all aspects illustrative and not restrictive. It is therefore understood that numerous modifications that have not been described can be devised without departing from the scope of the present disclosure.

The invention claimed is:
1. A switching power supply circuit control method for controlling a switching power supply circuit, wherein
said switching power supply circuit includes:
first and second input terminals;
first and second output terminals to which a capacitor and a load are connected;
a second power supply line connecting said second input terminal and said second output terminal; and
one or more circuits, each of said one or more circuits includes:
- a first power supply line connecting said first input terminal and said first output terminal;
- a reactor provided on said first power supply line;
- a diode connected in series to said reactor on said first power supply line, and positioned such that an anode thereof is directed toward said reactor; and
- a switch element provided between said second power supply line and a point between said reactor and said diode, said switching power supply circuit control method comprising steps of:
- when power consumption of said load is smaller than a first threshold, adopting a nonconductive mode as a current mode of current flowing through said reactor by making said switch element of each of said one or more circuits nonconductive to supply power from all of said one or more circuits to said load, and
- when said power consumption of said load is larger than said first threshold, making said switch element of at least one of said one or more circuits intermittently conductive in order to adopt at least one of the following as the current mode of current flowing through said reactor to supply power from all of said one or more circuits to said load: a discontinuous mode; a critical mode; and a continuous mode.

2. The switching power supply circuit control method according to claim 1, wherein
- a second threshold is larger than said first threshold, and a third threshold is larger than said second threshold,
- when said power consumption of said load is larger than said first threshold and smaller than said second threshold, a discontinuous mode is adopted as a current mode of current flowing through said reactor,
- when said power consumption of said load is larger than said second threshold and smaller than said third threshold, a critical mode is adopted as said current mode, and
- when said power consumption of said load is larger than said third threshold, a continuous mode is adopted as said current mode.

3. The switching power supply circuit control method according to claim 2, wherein
at least two of efficiency of said switching power supply circuit in a case of adopting the discontinuous mode as said current mode when said power consumption of said load is said first threshold, said efficiency in a case of adopting the critical mode as said current mode when said power consumption of said load is said second threshold, and said efficiency in a case of adopting the continuous mode as said current mode when said power consumption of said load is said third threshold are different from each other.

4. The switching power supply circuit control method according to claim 2, wherein
said switching power supply circuit generates a first magnitude of load-side harmonics in a case of adopting the discontinuous mode as said current mode when said power consumption of said load is said first threshold,
said switching power supply circuit generates a second magnitude of load-side harmonics in a case of adopting the critical mode as said current mode when said power consumption of said load is said second threshold,
said switching power supply circuit generates a third magnitude of load-side harmonics in a case of adopting the continuous mode as said current mode when said power consumption of said load is said third threshold, and
said first, second, and third thresholds are set in such manner as to make said first, second, and third magnitudes of load-side harmonics equal to one another.

5. The switching power supply circuit control method according to claim 1, wherein
a second threshold is larger than said first threshold,
when said power consumption of said load is larger than said first threshold and smaller than said second threshold, a discontinuous mode is adopted as a current mode of current flowing through said reactor, and
when said power consumption of said load is larger than said second threshold, a critical mode is adopted as said current mode.

6. The switching power supply circuit control method according to claim 5, wherein
efficiency of said switching power supply circuit in a case of adopting a nonconductive mode as said current mode when said power consumption of said load is said first threshold and said efficiency in a case of adopting the discontinuous mode as said current mode when said power consumption of said load is said second threshold are equal to each other.

7. The switching power supply circuit control method according to claim 1, wherein
a second threshold is larger than said first threshold,
when said power consumption of said load is larger than said first threshold and smaller than said second threshold, a critical mode is adopted as a current mode of current flowing through said reactor, and
when said power consumption of said load is larger than said second threshold, a continuous mode is adopted as said current mode.

8. The switching power supply circuit control method according to claim 7, wherein
efficiency of said switching power supply circuit in a case of adopting a nonconductive mode as said current mode when said power consumption of said load is said first threshold and said efficiency in a case of adopting the critical mode as said current mode when said power consumption of said load is said second threshold are equal to each other.

9. The switching power supply circuit control method according to claim 1, wherein
a second threshold is larger than said first threshold,
when said power consumption of said load is larger than said first threshold and smaller than said second threshold, a discontinuous mode is adopted as a current mode of current flowing through said reactor, and
when said power consumption of said load is larger than said second threshold, a continuous mode is adopted as said current mode.

10. The switching power supply circuit control method according to claim 9, wherein
efficiency of said switching power supply circuit in a case of adopting a nonconductive mode as said current mode when said power consumption of said load is said first threshold and said efficiency in a case of adopting the discontinuous mode as said current mode when said power consumption of said load is said second threshold are equal to each other.

11. A switching power supply circuit control method for controlling a switching power supply circuit, wherein said switching power supply circuit includes:
first and second input terminals;
first and second output terminals to which a capacitor and a load are connected;
a second power supply line connecting said second input terminal and said second output terminal; and
one or more circuits,
each of said one or more circuits includes:
a first power supply line connecting said first input terminal and said first output terminal;
a reactor provided on said first power supply line;
a diode connected in series to said reactor on said first power supply line, and positioned such that an anode thereof is directed toward said reactor; and
a switch element provided between said second power supply line and a point between said reactor and said diode,
said switching power supply circuit control method comprises steps of:
making said switch element of each of said one or more circuits nonconductive when power consumption of said load is smaller than a first threshold to supply power from all of said one or more circuits to said load; and
making said switch element of at least one of said one or more circuits intermittently conductive when said power consumption of said load is larger than said first threshold to supply power from all of said one or more circuits to said load,
a second threshold is larger than said first threshold, and a third threshold is larger than said second threshold,
when said power consumption of said load is larger than said first threshold and smaller than said second threshold, a discontinuous mode is adopted as a current mode of current flowing through said reactor,
when said power consumption of said load is larger than said second threshold and smaller than said third threshold, a critical mode is adopted as said current mode,
when said power consumption of said load is larger than said third threshold, a continuous mode is adopted as said current mode, and
magnitude of leakage current from said switching power supply circuit in a case of adopting the discontinuous mode as said current mode when said power consumption of said load is said first threshold, said magnitude of leakage current in a case of adopting the critical mode as said current mode when said power consumption of said load is said second threshold, and said magnitude of leakage current in a case of adopting the continuous mode as said current mode when said power consumption of said load is said third threshold are equal to one another.

12. A switching power supply circuit control method for controlling a switching power supply circuit, wherein
said switching power supply circuit includes:
first and second input terminals;
first and second output terminals to which a capacitor and a load are connected;
a second power supply line connecting said second input terminal and said second output terminal; and
one or more circuits,
each of said one or more circuits includes:
a first power supply line connecting said first input terminal and said first output terminal;
a reactor provided on said first power supply line;
a diode connected in series to said reactor on said first power supply line, and positioned such that an anode thereof is directed toward said reactor; and
a switch element provided between said second power supply line and a point between said reactor and said diode,
said switching power supply circuit control method comprises steps of:
making said switch element of each of said one or more circuits nonconductive when power consumption of said load is smaller than a first threshold to supply power from all of said one or more circuits to said load; and
making said switch element of at least one of said one or more circuits intermittently conductive when said power consumption of said load is larger than said first threshold to supply power from all of said one or more circuits to said load,
a second threshold is larger than said first threshold,
when said power consumption of said load is larger than said first threshold and smaller than said second threshold, a discontinuous mode is adopted as a current mode of current flowing through said reactor,
when said power consumption of said load is larger than said second threshold, a critical mode is adopted as said current mode, and
magnitude of leakage current from said switching power supply circuit in a case of adopting the discontinuous mode as said current mode when said power consumption of said load is said first threshold and said magnitude of leakage current in a case of adopting the critical mode as said current mode when said power consumption of said load is said second threshold are equal to each other.

13. A switching power supply circuit control method for controlling a switching power supply circuit, wherein
said switching power supply circuit includes:
first and second input terminals;
first and second output terminals to which a capacitor and a load are connected;
a second power supply line connecting said second input terminal and said second output terminal; and
one or more circuits,
each of said one or more circuits includes:
a first power supply line connecting said first input terminal and said first output terminal;
a reactor provided on said first power supply line;
a diode connected in series to said reactor on said first power supply line, and positioned such that an anode thereof is directed toward said reactor; and
a switch element provided between said second power supply line and a point between said reactor and said diode,
said switching power supply circuit control method comprises steps of:
making said switch element of each of said one or more circuits nonconductive when power consumption of said load is smaller than a first threshold to supply power from all of said one or more circuits to said load; and
making said switch element of at least one of said one or more circuits intermittently conductive when said power consumption of said load is larger than said first threshold to supply power from all of said one or more circuits to said load,
a second threshold is larger than said first threshold, when said power consumption of said load is larger than said first threshold and smaller than said second threshold, a critical mode is adopted as a current mode of current flowing through said reactor, when said power consumption of said load is larger than said second threshold, a continuous mode is adopted as said current mode, and magnitude of leakage current from said switching power supply circuit in a case of adopting the critical mode as said current mode when said power consumption of said load is said first threshold and said magnitude of leakage current in a case of adopting the continuous mode as said current mode when said power consumption of said load is said second threshold are equal to each other.

14. A switching power supply circuit control method for controlling a switching power supply circuit, wherein said switching power supply circuit includes:
first and second input terminals;
first and second output terminals to which a capacitor and a load are connected;
a second power supply line connecting said second input terminal and said second output terminal; and
one or more circuits, each of said one or more circuits includes:
a first power supply line connecting said first input terminal and said first output terminal;
a reactor provided on said first power supply line;
a diode connected in series to said reactor on said first power supply line, and positioned such that an anode thereof is directed toward said reactor; and
a switch element provided between said second power supply line and a point between said reactor and said diode, said switching power supply circuit control method comprises steps of:
making said switch element of each of said one or more circuits nonconductive when power consumption of said load is smaller than a first threshold to supply power from all of said one or more circuits to said load; and
making said switch element of at least one of said one or more circuits intermittently conductive when said power consumption of said load is larger than said first threshold to supply power from all of said one or more circuits to said load, a second threshold is larger than said first threshold, when said power consumption of said load is larger than said first threshold and smaller than said second threshold, a discontinuous mode is adopted as a current mode of current flowing through said reactor, when said power consumption of said load is larger than said second threshold, a continuous mode is adopted as said current mode, and magnitude of leakage current from said switching power supply circuit in a case of adopting the discontinuous mode as said current mode when said power consumption of said load is said first threshold and said magnitude of leakage current in a case of adopting the continuous mode as said current mode when said power consumption of said load is said second threshold are equal to each other.

15. A switching power supply circuit control for controlling a switching power supply circuit, wherein said switching power supply circuit includes:
first and second input terminals;
first and second output terminals to which a capacitor and a load are connected;
a second power supply line connecting said second input terminal and said second output terminal; and
one or more circuits, each of said one or more circuits includes:
a first power supply line connecting said first input terminal and said first output terminal;
a reactor provided on said first power supply line;
a diode connected in series to said reactor on said first power supply line, and positioned such that an anode thereof is directed toward said reactor; and
a switch element provided between said second power supply line and a point between said reactor and said diode, said switching power supply circuit control method comprises steps of:
making said switch element of each of said one or more circuits nonconductive when power consumption of said load is smaller than a first threshold to supply power from all of said one or more circuits to said load; and
making said switch element of at least one of said one or more circuits intermittently conductive when said power consumption of said load is larger than said first threshold to supply power from all of said one or more circuits to said load, said switching power supply circuit includes, as said one or more circuits, a pair of circuits, said pair of circuits is capable of performing an operation in an interleaved method, a second threshold is larger than said first threshold,
a third threshold is larger than said second threshold,
a fourth threshold is larger than said third threshold,
a fifth threshold is larger than said fourth threshold, when said power consumption of said load is larger than said first threshold and smaller than said second threshold, said switch element of one of said pair of circuits is made nonconductive, and a discontinuous mode is adopted as a current mode of current flowing through said reactor of the other one of said pair of circuits, when said power consumption of said load is larger than said second threshold and smaller than said third threshold, the discontinuous mode is adopted as the current mode of current flowing through said reactor of each of said pair of circuits, when said power consumption of said load is larger than said third threshold and smaller than said fourth threshold, said switch element of one of said pair of circuits is made nonconductive, and a critical mode is adopted as the current mode of current flowing through said reactor of the other one of said pair of circuits, when said power consumption of said load is larger than said fourth threshold and smaller than said fifth threshold, the critical mode is adopted as the current mode of current flowing through said reactor of each of said pair of circuits, or said switch element of one of said pair of circuits is made nonconductive, and a continuous mode is adopted as the current mode of current flowing through said reactor of the other one of said pair of circuits, and when said power consumption of said load is larger than said fifth threshold, the continuous mode is adopted as the current mode of current flowing through said reactor of each of said pair of circuits.

* * * * *